United States Patent [19]
Takamine

[11] Patent Number: 5,517,474
[45] Date of Patent: May 14, 1996

[54] TRACKING CONTROLLER FOR CORRECTING A TRACKING ERROR OFFSET

[75] Inventor: Kouichi Takamine, Hirakata, Japan

[73] Assignee: Matsushita Electric Industrial Co., Ltd., Osaka, Japan

[21] Appl. No.: 203,254

[22] Filed: Mar. 1, 1994

[30] Foreign Application Priority Data

Mar. 2, 1993 [JP] Japan .................................... 5-041228
Apr. 30, 1993 [JP] Japan .................................... 5-103844

[51] Int. Cl.$^6$ ............................................... G11B 7/09
[52] U.S. Cl. ............................ 369/44.32; 369/44.35; 369/54
[58] Field of Search ........................ 369/44.29, 44.32, 369/44.35, 44.36, 54

[56] References Cited

U.S. PATENT DOCUMENTS

| | | | |
|---|---|---|---|
| 4,773,055 | 9/1988 | Gijzen et al. | 369/44.32 X |
| 4,799,206 | 1/1989 | Imanaka | 369/44.32 X |
| 5,121,374 | 6/1992 | Barton et al. | 369/44.32 X |
| 5,138,593 | 8/1992 | Yokoyama | 369/44.32 X |
| 5,343,454 | 8/1994 | Watanabe et al. | 369/44.32 |
| 5,404,346 | 4/1995 | Koyama et al. | 369/44.32 |

Primary Examiner—W. R. Young
Attorney, Agent, or Firm—Beveridge, DeGrandi, Weilacher & Young

[57] ABSTRACT

A galvano-mirror recorder for moving the light beam in a circular pattern applied to a disk is rotated by a driving circuit. A track error signal is obtained from an output of a photosensor for detecting a deviation of a light beam applied position from a track on the disk. To detect a rotation angle when rotating the galvano-mirror recorder with a photosensor and cancel an offset generated due to rotation of the galvano-mirror recorder in accordance with the detected rotation angle, a differential amplifier for correcting the track error signal is used to correct the offset of the track error signal due to rotation.

Moreover, in the case of retrieval of the tracks on the disk, the output of a phase compensation circuit for phase-compensating the sum of the output of a low-pass filter in accordance with the output of the photosensor and the output of a DC cut filter in accordance with the output of the photosensor is returned to the negative input terminal for driving the galvano-mirror recorder to lock the galvano-mirror recorder so that the center of a light spot is aligned with the center of the optical axis of an optical system even if a disturbance occurs.

4 Claims, 23 Drawing Sheets

Fig. 16(a)
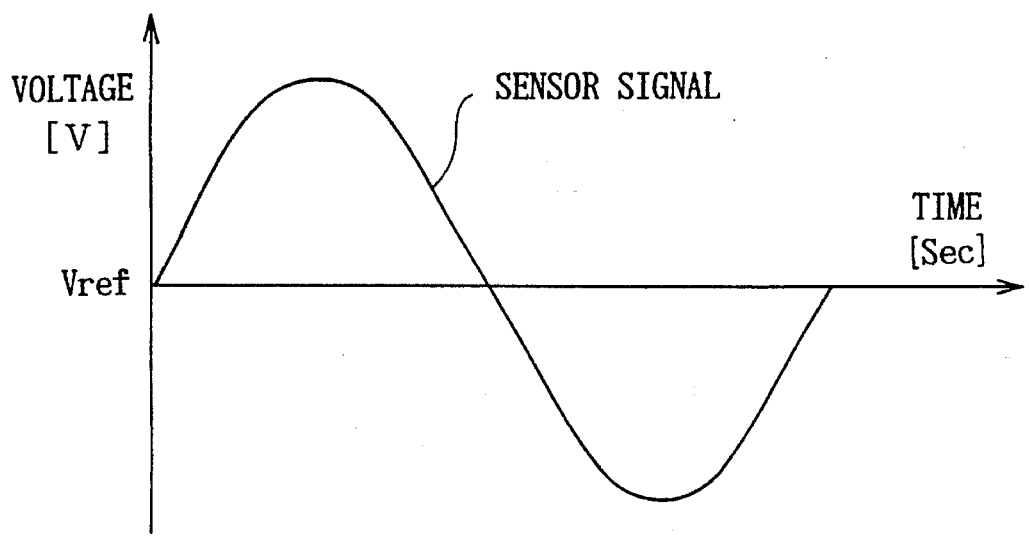
Fig. 16(b)
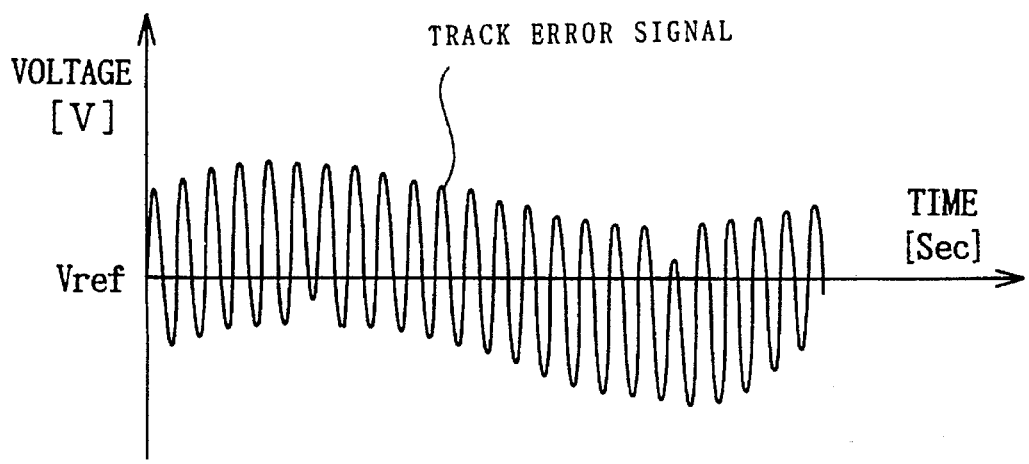
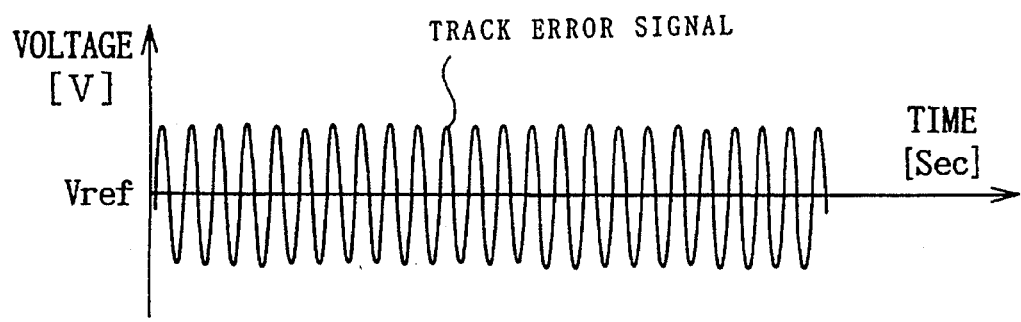
Fig. 16(c)

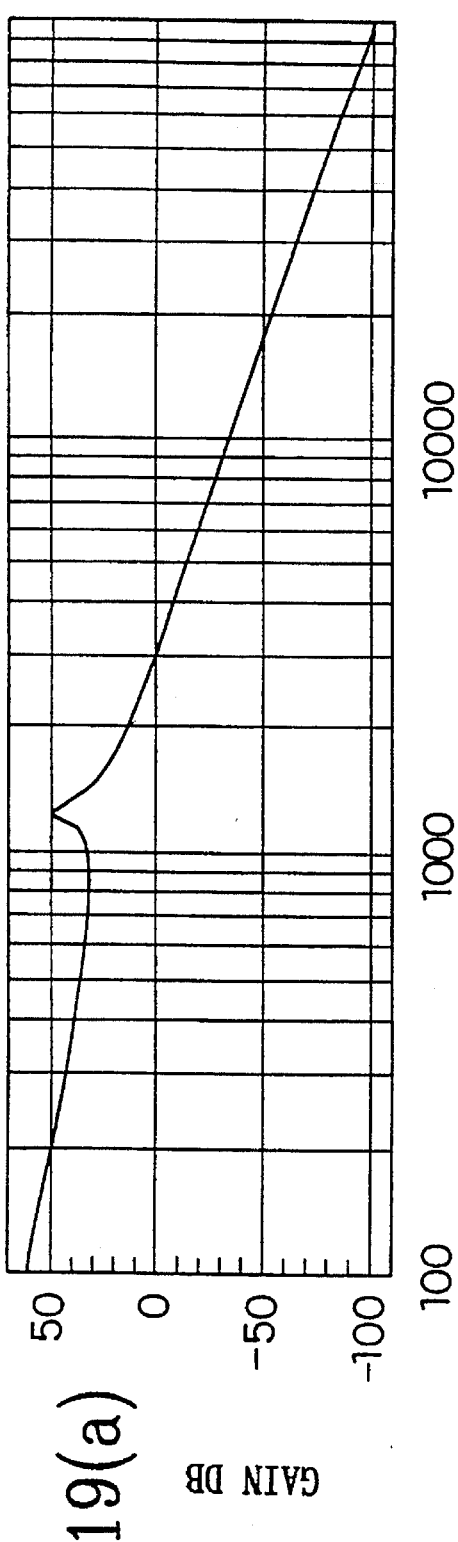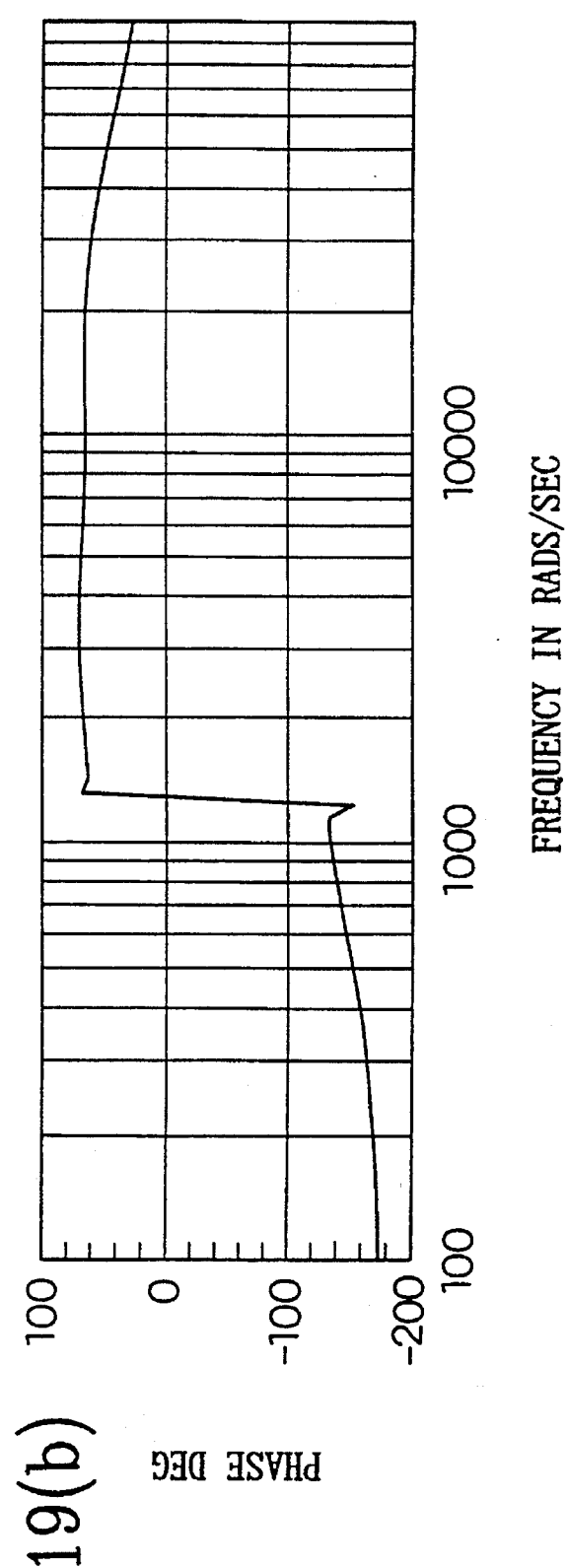
Fig. 19(a)
Fig. 19(b)

TRACKING CONTROLLER FOR CORRECTING A TRACKING ERROR OFFSET

BACKGROUND OF THE INVENTION

1. Field of the Invention

The present invention relates to a tracking controller of an apparatus for optically recording a signal into a recording medium or reproducing the signal recorded in the recording medium by using a light source of a laser or the like, particularly for performing control so that a light beam of the optical recording/reproducing apparatus accurately scans tracks on a recording medium.

2. Description of the Related Art

In recent years, it is known that tracking is performed not by moving the whole of an optical system but by separating a part of the optical system, setting it to a movable part, and moving the movable part, namely, the optical head in order to decrease the depth of a recording/reproducing apparatus and realize high-speed retrieval. Moreover, to decrease the weight of a movable part, an optical recording/reproducing apparatus is known in which a galvano-mirror recorder is used as a tracking actuator and the galvano-mirror recorder is set to a stationary part. A conventional tracking controller is described below by referring to FIGS. 1 and 2.

FIG. 1 is a block diagram showing the constituents of the conventional tracking controller. A light beam 108 emitted from a light source 101 of a semiconductor laser or the like is transformed into parallel rays by a collimator lens 102 and thereafter the parallel rays pass through a beam splitter 103 and are reflected by a galvano-mirror recorder 119 serving as a fine tracking actuator.

The rays reflected by the galvano-mirror recorder 119 are further reflected by a mirror 104 arranged at a movable part and thereafter they are converged by an object glass 105 and applied onto a rotating disk 107. The disk 107 connects with a spindle motor 106 for rotating the disk 107.

A light beam reflected by the disk 107 passes through the object glass 105 and then it is reflected by the mirror 104 and galvano-mirror recorder 119 and reaches the beam splitter 103. The light beam reaching the beam splitter 103 is reflected toward a convex lens 109. After the light beam passes through the convex lens 109, it is split into light beams 111 and 115 by a cylindrical polarization beam splitter 110 (hereafter referred to as cylindrical P.B.S.).

One split light beam 111 is converged on a dual-face photosensor 112. Outputs A and B corresponding to the luminous energy of the converged light beam emitted from the two-split face are inputted to each terminal of a differential amplifier 114. A track error signal is obtained by performing the operation for obtaining the difference between the outputs A and B of the photosensor 112 with the differential amplifier 114. The method for thus detecting the track error signal as an output of the differential amplifier 114 is disclosed in the official gazette of Japanese Patent Laid-Open No. Sho 49-60702 and is known as the push-pull method.

The outputs A and B coming from the two-split face of the photosensor 112 are also inputted to an adding amplifier 116. The sum of the outputs A and B and a luminous energy sum signal are obtained by the adding amplifier 116.

The track error signal outputted from the differential amplifier 114 is inputted to a variable amplifier 117. The gain of the variable amplifier 117 is adjusted so that the amplitude of the track error signal at the output point "a" is kept almost constant. The output of the variable amplifier 117 is inputted to a divider 118. The luminous energy sum signal is also inputted to the divider 118 from the adding amplifier 116. BY dividing the output of the variable amplifier 117 by that of the adding amplifier 116, the amplitude of the track error signal is kept almost constant against a change of the luminous energy of the light beam or a change of the reflectance of the disk 107 when recording or deleting data.

The other split light beam 115 split by the cylindrical P.B.S. 110 is converged on the quad-face photosensor 112. A focus error signal for detecting that the light beam on the disk 107 has deviated from a predetermined convergent state is obtained in accordance with the output of the four-split face. In this case, the focus error signal is detected by using the differential amplifier 113 and by means of the known astigmatism method. The light beam is controlled so that it is applied onto the disk 107 under the predetermined convergent state by the known focus control for driving a focus actuator (not illustrated) in accordance with the focus error signal. A detailed description of the above focus control is omitted because the focus control is not directly related to the present invention.

The operation of the entire optical system when the light beam converged by the object glass 105 is controlled so that it is accurately applied onto a target track, that is, when tracking control is performed is briefly described below. This tracking control is performed by mainly driving the galvano-mirror recorder 119 serving as a fine tracking actuator at a high frequency and mainly driving a linear motor 120 serving as a coarse tracking actuator at a low frequency. Retrieval for moving a light spot in a wide range covering the entire area of the disk 107 is also performed by driving the linear motor 120.

As described above, the track error signal whose amplitude is kept almost constant against a change of the luminous energy of the light beam or a change of the reflectance of the disk 107 by the divider 118 is inputted to a phase compensation circuit 122 of a tracking servo loop (hereafter referred to as TR servo loop). The output of the phase compensation circuit 122 of the TR servo loop is inputted to one input terminal of a signal selection circuit 127 for selecting whether to perform tracking control in which the light spot applied onto the disk 107 is controlled so as to follow tracks on the disk 107 or to execute the lock servo operation for securing the galvano-mirror recorder 119 to a desired position. A signal outputted from a phase compensation circuit 128 for compensating the phase at the gain intersection point of the lock servo loop is inputted to the other input terminal of the signal selection circuit. An output terminal of the signal selection circuit 127 is connected to a driving circuit 126 for driving the galvano-mirror recorder 119. When a signal sent from the phase compensation circuit 122 of the TR servo loop is selected by the signal selection circuit 127, the galvano-mirror recorder 119 is rotated by the output of the driving circuit 126 corresponding to the track error signal. The direction for the light beam to be reflected changes due to rotation of the galvano-mirror recorder 119 and the light spot moves in the direction crossing the tracks on the disk 107 (hereafter referred to as the tracking direction) so that it is located on the track. Thus, the light spot is controlled so that it is continuously located at the center of a target track.

The mirror 104 and object glass 105 are mounted on the linear motor 120 capable of moving in the track direction from the inside to outside perimeters of the disk 107. This mechanism constitutes an optical head. The light spot moves from the inside to the outside perimeters of the disk 107 in the tracking direction in accordance with movement of the linear motor 120. When tracking control is performed, the output of the phase compensation circuit 122 of the above TR servo loop is inputted, via the equivalent filter 123, to the phase compensation circuit 124 used to control the linear motor 120. The equivalent filter 123 has a characteristic approximately equal to the input/output characteristic of the galvano-mirror recorder 119 serving as a fine tracking actuator, that is, the rotational characteristic for input. The output of the phase compensation circuit 124 is inputted to a driving circuit 125 for driving the linear motor 120 and the linear motor 120 is controlled by the output so that the galvano-mirror recorder 119 can rotate while maintaining the natural state, that is, the state in which the optical axis center of the optical system is aligned with that of the light beam entering the object glass 105.

A lock servo for preventing the galvano-mirror recorder 119 set to the stationary part from vibrating due to a disturbance and securing it to a predetermined position when tracking control is not performed or when the linear motor 120 performs operations of retrieval in the tracking direction on the disk 107 is described below by referring to FIGS. 1 and 2. FIG. 2 is a block diagram of a conventional lock servo. The constituents of the lock servo are described below by referring to FIG. 2. A signal detected by a reflection-type photosensor 121 for detecting a rotation angle of the galvano-mirror recorder 119 is inputted to the driving circuit 126 of the galvano-mirror recorder 119 through the phase compensation circuit 128 and signal selection circuit 127 of the lock servo loop and returned to the galvano-mirror recorder 119 in the form of negative feedback. The lock servo is described below again by referring to FIG. 1. The rotation angle of the galvano-mirror recorder 119 is detected by the reflection-type photosensor 121 and returned as an input of the galvano-mirror recorder 119 in the form of negative feedback through the phase compensation circuit 128 for compensating the phase at the gain intersection point of the lock servo. By executing the operation of the lock servo comprising the above constituents, it is possible to secure the galvano-mirror recorder 119 to a desired position in accordance with a rotation angle detection signal sent from the reflection-type photosensor 121.

For the conventional tracking controller shown in FIG. 1, however, the galvano-mirror recorder 119 is used as a fine tracking actuator, and moreover an optical head is constituted by setting the galvano-mirror recorder 119 to the stationary part and arranging the mirror 104 and object glass 105 on the linear motor 120 serving as a coarse tracking actuator. Therefore, the length of the optical path from the galvano-mirror recorder 119 to the object glass 105 via the mirror 104 increases. When the optical path gets longer, the optical axis of the optical system is easily deviated from the center of the light beam if the attitude of the galvano-mirror recorder 119 under the non-controlled state changes from the attitude under the initial state i.e., the state in which the optical axis of the optical system is aligned with the center of the light beam due to rotation on the influence of gravity. The deviation of the optical axis from the center of the light beam is defined as optical axis deviation in this specification. When the optical axis error occurs, an offset occurs in the track error signal. The offset increases as the optical path gets longer.

The optical axis deviation caused by rotation of the galvano-mirror recorder 119 is described below by referring to FIG. 3. As shown in FIG. 3, when the galvano-mirror recorder 119 rotates, the above optical axis deviation occurs and the track error signal has an offset. In other words, when tracking control is performed, the optical axis deviation occurs due to rotation of the galvano-mirror recorder 119. Even when tracking control is not performed, the optical axis shifts in the rotational direction similarly to the case in which tracking control is performed if the attitude change of the galvano-mirror recorder 119 described above occurs. Therefore when the optical axis deviation occurs, a large offset occurs in the track error signal due to spherical aberration of the object glass 105, coma aberration of luminous flux, or eclipse due to a lens rim. If tracking control is performed under the above state, the offset already generated in the track error signal is further increased because the galvano-mirror recorder 119 is further rotated.

If the optical axis deviation increases when tracking control is not performed, the offset of the track error signal also increases. This type of offset may not be removed by a circuit behind the circuit for detecting the track error signal because the offset gets too large and thereby the circuit is saturated. Moreover, the amplitude of the track error signal may decrease or the track error signal may disappear because of eclipse or the like due to the lens rim. When the track error signal disappears, it is impossible to make the track error signal appear again even if the offset is removed by the circuit.

If the track error signal has an offset when tracking control is performed, the light spot on the disk 107 is controlled by a tracking control system so that it is located at a position deviated from the center of a target track. That is, the light spot on the disk 107 is controlled into an off-track state.

If the above off-track state occurs due to rotation of the galvano-mirror recorder 119 when tracking control is performed, a problem on degradation of the tracking accuracy occurs such that, for example, the recording characteristic for recording data in the disk 107 or the reproducing characteristic for reproducing the data is degraded or a light spot is easily deviated from a track.

Moreover, if the attitude of the galvano-mirror recorder 119 changes due to a variation with time or a change of environmental temperature when tracking control is not performed, the center of the light beam is deviated from the optical axis of the optical system and an offset occurs in the track error signal. If an optical axis deviation occurs due to a variation with time or a change of environmental temperature, a large offset may occur in the track error signal or the track error signal may disappear. When the track error signal has a large offset or it disappears, it is impossible to securely execute the operation of a tracking control system. Thus, problems occur that the recording/reproducing apparatus cannot be started and its reliability is greatly degraded.

When using the reflection-type photosensor 121 described in the Prior Art as a rotation angle detector of the galvano-mirror recorder 119, a signal outputted from the reflection-type photosensor 121 includes a direct-current offset (hereafter referred to as a DC offset). Moreover, the detection characteristic of the reflection-type photosensor 121 changes due to a temperature change or a variation with time and the DC offset changes. When the DC offset occurs in the output of the reflection-type photosensor 121 or it changes, the locked position of the galvano-mirror recorder 119 changes by a value equivalent to the DC offset. When the locked position of the galvano-mirror recorder 119 changes, the optical axis of the optical system is deviated. This optical axis deviation causes a large offset in the track error signal.

When the operation of the lock servo of the galvano-mirror recorder 119 is executed for a large DC offset of the reflection-type photosensor 121, the galvano-mirror recorder 119 is locked at a position where an optical axis deviation occurs and an offset occurs in the track error signal or the amplitude of the track error signal decreases. Thereby, counting errors easily occur under retrieval.

SUMMARY OF THE INVENTION

The object of the present invention is to provide a tracking controller with a high reliability capable of continuously performing tracking control on the basis of the optical axis center of the optical system of an optical head by correcting the fluctuation of the initial adjustment of the optical head or optical axis deviation due to a variation with time and capable of performing accurate and high-precision tracking control by correcting an offset caused by rotation of a galvano-mirror recorder.

To achieve the above object, the tracking controller of a first embodiment of the present invention galvano-mirror recorder operating in a very small range by moving the light beam in a circular pattern with converging means for converging the light beam on a recording medium and moving means for receiving a driving signal and moving the convergent point of the light beam on the recording medium in the direction crossing the tracks formed on the recording medium in accordance with the driving signal. The invention also has coarse moving means for moving in a large range, track error detecting means for generating a track error signal correspondingly to the position of the convergent point of the light beam for one of the tracks, tracking controlling means for generating a first driving signal for driving the moving means so that the convergent point of the light beam is located at the above track among the tracks in accordance with the track error signal and supplying the first driving signal to the moving means as the driving signal. This invention further has means for changing the operative and inoperative states of the tracking controlling means, driving means for generating a second driving signal for driving the moving means so that the convergent point of the light beam crosses a predetermined number of tracks among the tracks when the tracking controlling means is under the inoperative state. The invention also has rotation angle detecting means for detecting a rotation angle of a light beam, correction value calculating means for calculating a correction value for negating the offset of a track error signal generated due to rotation of a light beam in accordance with a rotation angle signal from the rotation angle detecting means obtained by the fact that the moving means is driven by the second driving signal when the tracking controlling means is under the inoperative state, and correcting means for correcting the offset of the track error signal so as to substantially decrease the offset to zero in accordance with the obtained offset correction value.

Moreover, a second embodiment of the present invention galvanomirror recorder locking means for returning the output of a phase compensation circuit as an input for driving a galvano-mirror recorder in the form of negative feedback by using the galvano-mirror recorder operating in a very small range by moving the light beam in a circular pattern with converging means for converging the light beam on a recording medium and moving means for receiving a driving signal and moving the convergent point of the light beam in the direction crossing the tracks formed on the recording medium in accordance with the driving signal. The second embodiment has coarse moving means moving in a large range, track error detecting means for generating a track error signal correspondingly to the position of the convergent point of the light beam for one of the tracks, a low-pass filter for extracting the low-frequency component of the output of the track error detecting means, rotation angle detecting means for detecting a rotation angle of the light beam. The second embodiment also has a DC cut filter for cutting off the DC component of the rotation angle detecting means, adding means for adding the output of the low-pass filter and that of the DC cut filter, and a phase compensation circuit for compensating the phase of the output of the adding means and comprising means for selecting whether to perform tracking control for driving the moving means so that the convergent point of the light beam is located on the above track among the tracks or to lock the galvano-mirror recorder in accordance with the output of the rotation angle detecting means.

Furthermore, a third embodiment of the present invention has galvanomirror recorder locking means for returning the output of a phase compensation circuit as an input for driving a galvano-mirror recorder in the form of negative feedback by using the galvano-mirror recorder operating in a very small range by moving the light beam in a circular pattern with converging means for converging the light beam on a recording medium and moving means for receiving a driving signal and moving the convergent point of the light beam in the direction crossing the tracks formed on the recording medium in accordance with the driving signal. The third embodiment also has coarse moving means for moving in a large range, tracking error detecting means for generating a track error signal correspondingly to the position of the convergent point of the light beam for one of the tracks, an equivalent filter having a transfer function equal to that of the galvano-mirror recorder for extracting the low-frequency component of the output of the track error detecting means, rotation angle detecting means for detecting a rotation angle of the light beam. The third embodiment also has cut filter for cutting off the DC component of the rotation angle detecting means, adding means for adding the output of the low-pass filter and that of the DC cut filter, and a phase compensation circuit for compensating the phase of the output of the adding means and comprising means for selecting whether to perform tracking control for driving the moving means so that the convergent point of the light beam is located on the above track among the tracks in accordance with the track error signal or to lock the galvano-mirror recorder in accordance with the output of the rotation angle detecting means.

Furthermore, a fourth embodiment of the present invention has galvanomirror recorder locking means for returning the output of a phase compensation circuit as an input for driving a galvano-mirror recorder in the form of negative feedback by using the galvano-mirror recorder operating in a very small range by moving the light beam in a circular pattern with converging means for converging the light beam on a recording medium and moving means for receiving a driving signal and moving the convergent point of the light beam on the recording medium in the direction crossing the tracks formed on the recording medium in accordance with the driving signal. The fourth embodiment also has coarse moving means for moving in a large range, tracking error detecting means for generating a track error signal correspondingly to the position of the convergent point of the light beam for one of the tracks, a low-pass filter for extracting the low-frequency component of the output of the track error detecting means, and a phase compensation circuit for compensating the phase of the output of the low-pass filter.

Furthermore, a fifth embodiment of the present invention has galvanomirror recorder locking means for returning the output of a phase compensation circuit as an input for driving a galvano-mirror recorder in the form of negative feedback by using the galvano-mirror recorder operating in a very small range by moving the light beam in a circular pattern with converging means for converging the light beam on a recording medium and moving means for receiving a driving signal and moving the convergent point of the light beam in the direction crossing the tracks formed on the recording medium in accordance with the driving signal. The fifth embodiment also has moving means for moving in a large range, tracking error detecting means for generating a track error signal correspondingly to the position of the convergent point of the light beam for one of the tracks, an equivalent filter having a transfer function equal to that of the galvano-mirror recorder for extracting the low-frequency component of the output of the track error detecting means, and a phase compensation circuit for compensating the phase of the output of the low-pass filter.

In the case of the above first embodiment, the offset of the track error signal generated due to rotation of the galvano-mirror recorder is corrected when tracking is controlled, accurate and high-precision tracking control is realized, and the recording/reproducing characteristic with a high reliability is obtained. By correcting the optical axis deviation when tracking is not controlled, it is possible to continuously perform accurate and high-precision tracking control of the optical axis of the optical system in an optical head. Moreover, even when a track error signal disappears because the optical axis center of the optical system is greatly deviated due to a variation with time or the like and thereby the offset of the track error signal increases, it is possible to make the track error signal appear by correcting the optical axis deviation and recovering the recording/reproducing apparatus from the inoperable state due to the track error signal. Moreover, it is possible to securely execute tracking control by adjusting the offset of the track error signal. Therefore, it is possible to secure the stable control performance and retrieval performance, and moreover prevent the inoperable state and greatly improve the reliability of the recording/reproducing apparatus.

In the case of the above second embodiment, the center of the convergent point of a light beam is continuously aligned with that of the optical axis of an optical system so that no optical axis deviation occurs and the galvano-mirror recorder is locked even if the recording/reproducing apparatus has a disturbance because the output of the phase compensation circuit for phase-compensating the total output obtained by adding the output of the low-pass filter in accordance with the output of the track error detecting means and the output of the DC cut filter in accordance with the output of the detecting means is returned as an input for driving the galvano-mirror recorder in the form of negative feedback when retrieving and controlling the tracks of a recording medium by the convergent point of a light beam.

In the case of the above third embodiment, the center of the convergent point of a light beam is continuously aligned with that of the optical axis of an optical system so that no optical axis deviation occurs and the galvano-mirror recorder is locked even if the recording/reproducing apparatus has a disturbance because the output of the phase compensation circuit for phase-compensating the total output obtained by adding the output of the equivalent filter in accordance with the output of the track error detecting means and the output of the DC cut filter in accordance with the output of the detecting means is returned as an input for driving the galvano-mirror recorder in the form of negative feedback when retrieving and controlling the tracks of a recording medium by the convergent point of a light beam.

In the case of the above fourth embodiment, the center of the convergent point of a light beam is continuously aligned with that of the optical axis of an optical system so that no optical axis deviation occurs and the galvano-mirror recorder is locked even if the recording/reproducing apparatus has a disturbance because the output of the phase compensation circuit for phase-compensating the output of the low-pass filter in accordance with the output of the track error detecting means is returned as an input for driving the galvano-mirror recorder in the form of negative feedback when retrieving and controlling the tracks of a recording medium by the convergent point of a light beam.

In the case of the above fifth embodiment, the center of the convergent point of a light beam is continuously aligned with that of the optical axis of an optical system so that no optical axis deviation occurs and the galvano-mirror recorder is locked even if the recording/reproducing apparatus has a disturbance because the output of the phase compensation circuit for phase-compensating the output of the equivalent filter in accordance with the output of the track error detecting means is returned as an input for driving the galvano-mirror recorder in the form of negative feedback when retrieving and controlling the tracks of a recording medium by the convergent point of a light beam.

BRIEF DESCRIPTION OF THE DRAWINGS

FIGS. 7(a) and 7(b) show illustrations of a track error signal detecting system, in which FIG. 7(a) shows illustrations of the shapes of a track and a light spot on a disk and FIG. 7(b) shows a schematic view of a track error signal detecting optical system;

FIGS. 9(a) to 9(c) show illustrations of an optical axis deviation and a light spot on a photosensor, in which FIG. 9(a) shows an illustration of the shape of the light spot on the photosensor when the light spot is present on a track under the state in which there is no optical axis deviation, FIG. 9(b) shows an illustration of the shape of the light spot on the photosensor when the light spot is present on the track under the state in which the optical axis deviation occurs at an outside perimeter of a disk, and FIG. 9(c) shows an illustration of the shape of the light spot on the photosensor when the light spot is present on the track under the state in which the optical axis deviation occurs at an inside perimeter of the disk;

FIGS. 16(a) to 16(c) show waveforms of sensor and track error signals when driving a galvano-mirror recorder by a sine-wave driving signal sent from driving-signal generating means in the embodiment, in which FIG. 16(a) shows a waveform of the sensor signal when driving the galvanomirror recorder in the embodiment by the driving signal sent from the driving-signal generating means, FIG. 16(b) shows a waveform of the track error signal before off-track correction when driving the galvanomirror recorder in the embodiment by the driving signal sent from the driving-signal generating means, and FIG. 16(c) shows a waveform of the track error signal after off-track correction when driving the galvano-mirror recorder in the embodiment by the driving signal sent from the driving-signal generating means;

FIGS. 19(a) and 19(b) show Bode diagrams of the open-loop frequency characteristic of the TRS servo of the embodiment;

FIGS. 22(a) and 22(b) are waveforms of driving and track-error signals when driving a galvano-mirror recorder by a sine-wave driving signal sent from driving-signal generating means in the embodiment, in which FIG. 22(a) shows a waveform of the driving signal when driving the galvanomirror recorder in the embodiment by the driving signal sent from the driving-signal generating means and FIG. 22(b) shows a waveform of the track error signal before off-track correction when driving the galvano-mirror recorder in the embodiment by the driving signal sent from the driving-signal generating means;

FIGS. 23(a) through 23(c) are waveforms of driving and track-error signals when driving a galvano-mirror recorder by a DC driving signal sent from driving-signal generating means in the embodiment, in which FIG. 23(a) shows a waveform of the driving signal when driving the galvano-mirror recorder in the embodiment by the driving signal sent from the driving-signal generating means, FIG. 23(b) shows a waveform of the track error signal before off-track correction when driving the galvano-mirror recorder in the embodiment by a comparatively small DC driving signal sent from the driving-signal generating means, and FIG. 23(c) shows a waveform of the track error signal before off-track correction when driving the galvano-mirror recorder in the embodiment by a comparatively large DC driving signal sent from the driving-signal generating means;

DESCRIPTION OF THE PREFERRED EMBODIMENT

The constituents of the first embodiment of the tracking controller of the present invention are described below together with its operation by referring to FIGS. 4 to 19.

Figure 1:
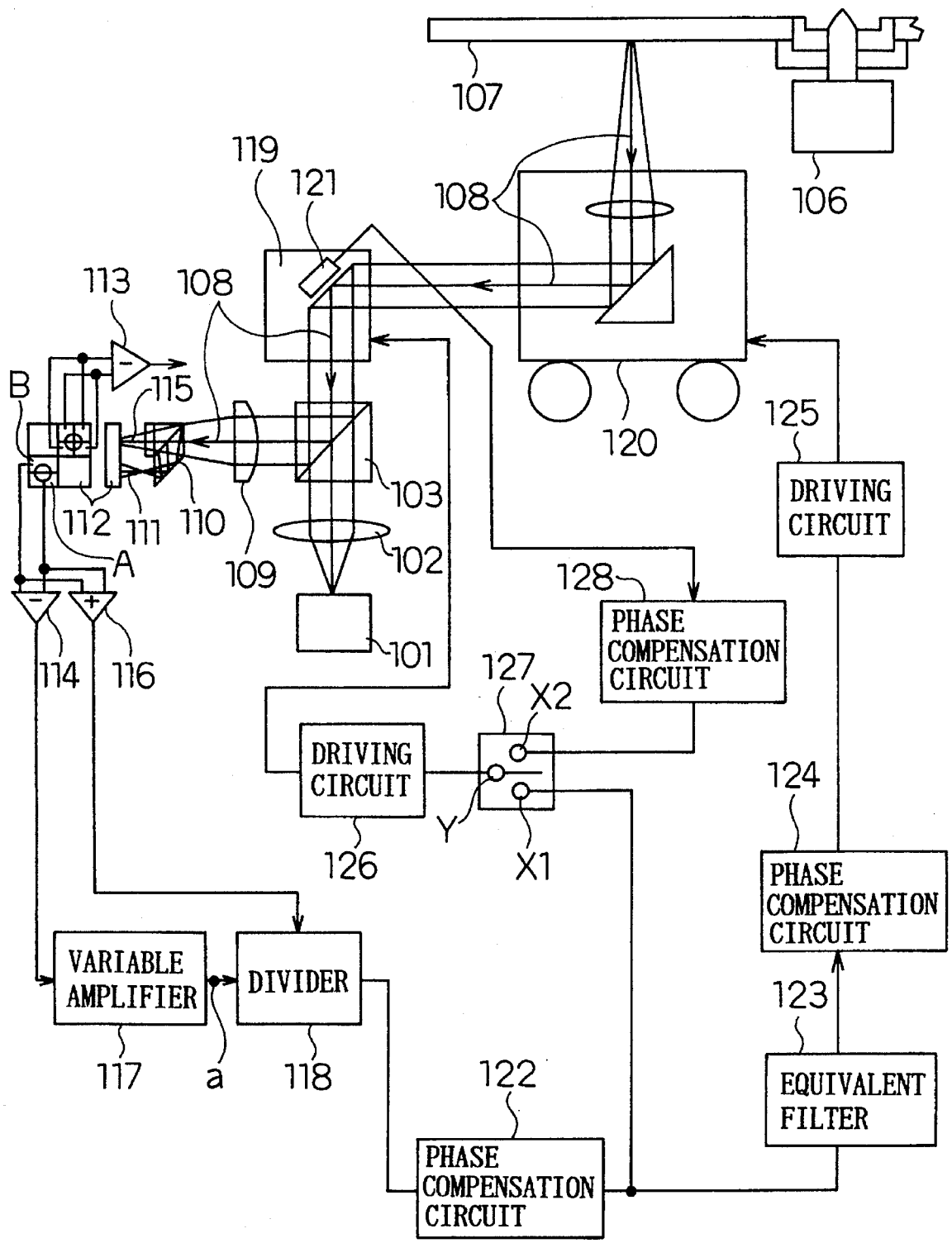
FIG. 1 is a block diagram for explaining the constituents of an conventional tracking controller.
Figure 2:
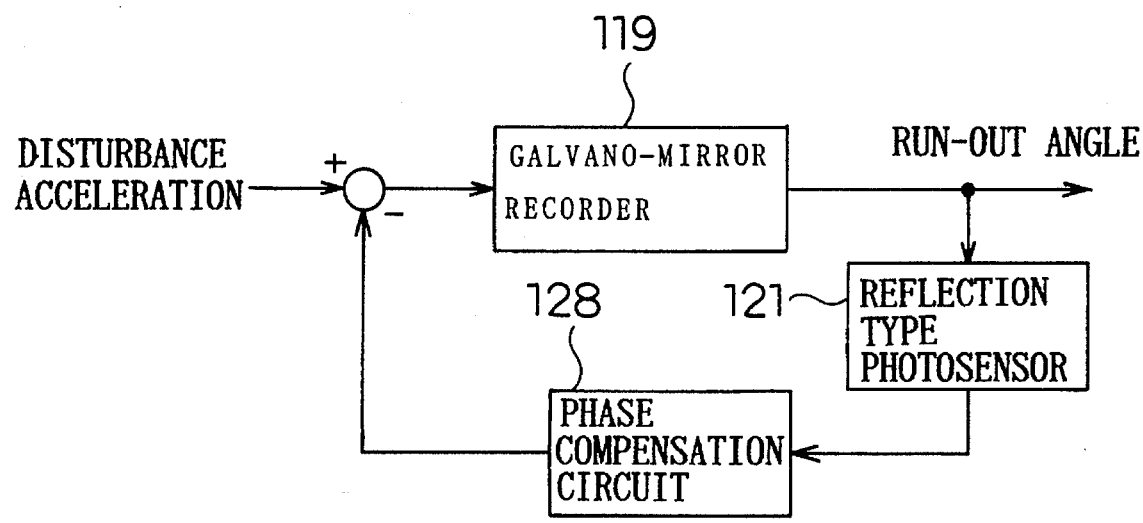
FIG. 2 is a block diagram for explaining a conventional lock servo.
Figure 3:
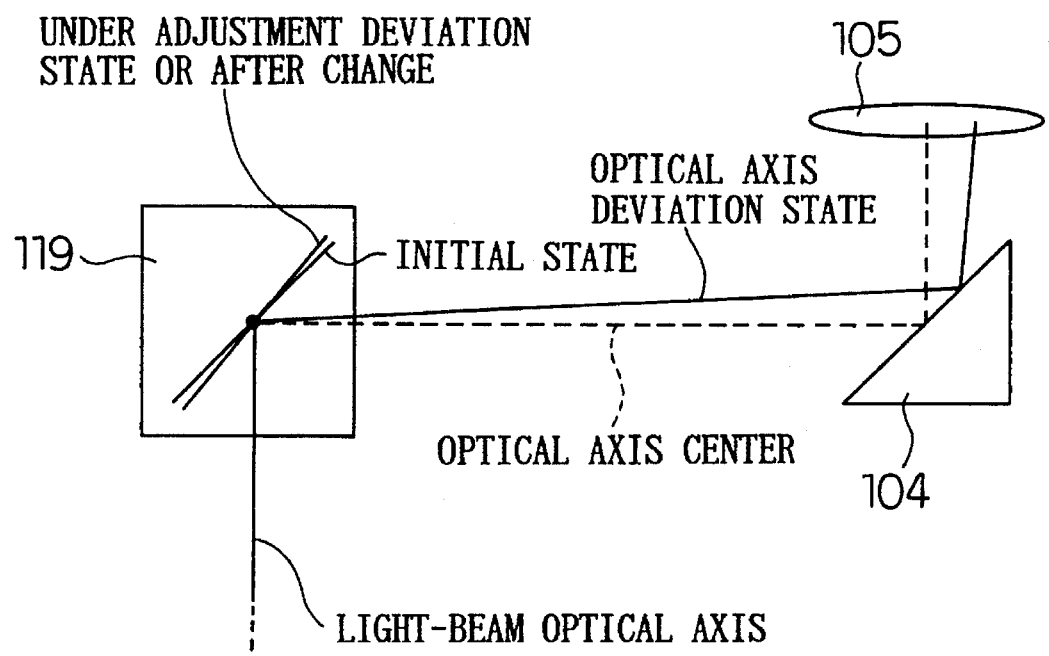
FIG. 3 is an illustration for explaining an optical axis deviation due to a state change of a galvano-mirror recorder.
Figure 4:
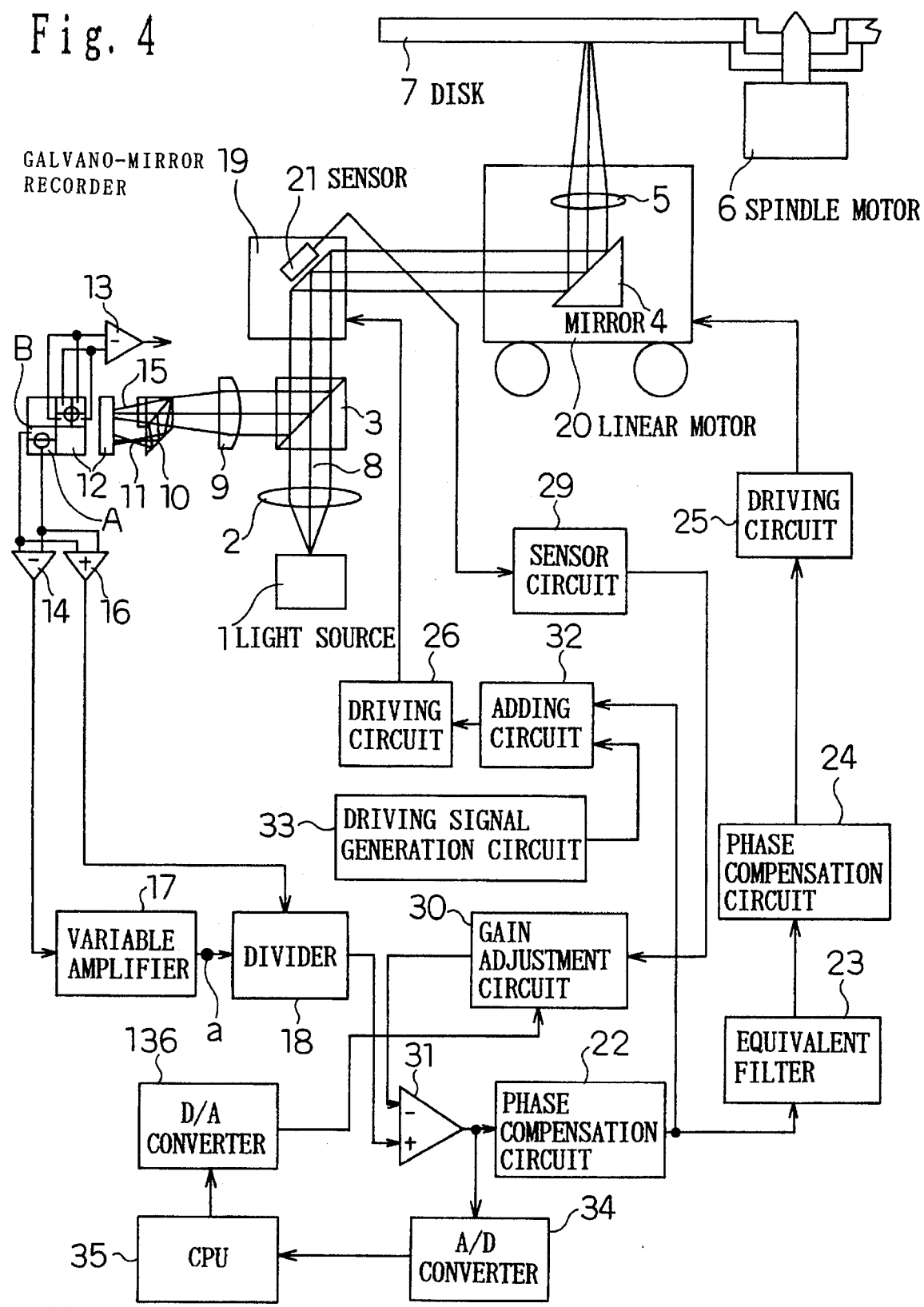
FIG. 4 is a block diagram showing the constituents Of a tracking controller for explaining the first embodiment of the present invention.

FIG. 4 is a block diagram showing the constituents of the first embodiment of the tracking controller of the present invention. A light beam 8 emitted from a light source 1 of a semiconductor laser or the like are transformed into parallel rays by a collimator lens 2 and thereafter the parallel rays pass through a beam splitter 3 and are reflected by a galvano-mirror recorder 19 serving as a fine tracking actuator. The reflected rays are further reflected by a mirror 4 on a movable part and thereafter converged by an object glass 5 and applied onto a rotating disk 7. The disk 7 connects with a spindle motor 6 for rotating the disk.

A light beam reflected by the disk 7 passes through the object lens 5 and then it is reflected by the mirror 4 and galvano-mirror recorder 19 in order and enters the beam splitter 3. The light beam entering the beam splitter 3 passes through a convex lens 9 and thereafter it is split into light beams 11 and 15 by a cylindrical polarization beam splitter 10 (hereafter referred to as cylindrical P.B.S.).

One split light beam is converged on a photosensor 12. The photosensor 12 has a plurality of detection faces and one of the detection faces is split into two parts. The light beam 11 is converged on the two-split face. Outputs A and B corresponding to the intensities of the light beam converged onto the two-split face are inputted to each terminal of a differential amplifier 14. A track error signal is obtained by calculating the difference between the outputs A and B, with the differential amplifier 14.

Thus, the track error signal is obtained by the push-pull method. The outputs A and B from the two-split face of the photosensor 12 are also inputted to an adding amplifier 16 where a luminous energy sum signal is obtained which is the sum of the outputs A and B.

The track error signal outputted from the differential amplifier 14 is inputted to a variable amplifier 17. The gain of the variable amplifier 17 is adjusted at its output point "a" so that the amplitude of the track error signal is kept almost constant. The output of the variable amplifier 17 is inputted to a divider 18. Moreover, the luminous energy sum signal outputted from the variable amplifier 16 is inputted to the divider 18. The divider 18 makes the amplitude of the track error signal almost constant against a luminous energy change of the light beam or a change of the reflectance of the disk 7 when data is recorded or deleted by dividing the track error signal sent from the variable amplifier 17 by the luminous energy sum signal sent from the adding amplifier 16.

The other light beam 15 split by the cylindrical P.B.S. 10 is also converged on the photosensor 12. The place where the light beam 15 is converged is not the above two-split face but is instead a four-split detection face. A focus error signal for detecting that the light beam on the disk 7 is deviated from a predetermined convergent state is obtained from an output corresponding to the intensity of the light beam converged on the four-split face. For this embodiment, the focus error signal is detected by the known astigmatism method and the light beam on the disk 7 is controlled so that it is brought into a predetermined convergent state by the known focus control for driving a focus actuator (not illustrated) in accordance with the focus error signal. A detailed description of the focus control is omitted because the focus control is not directly related to the present invention.

Detection of the track error signal by the push-pull method is described below by referring to FIGS. 7 and 8.

Figure 7A:
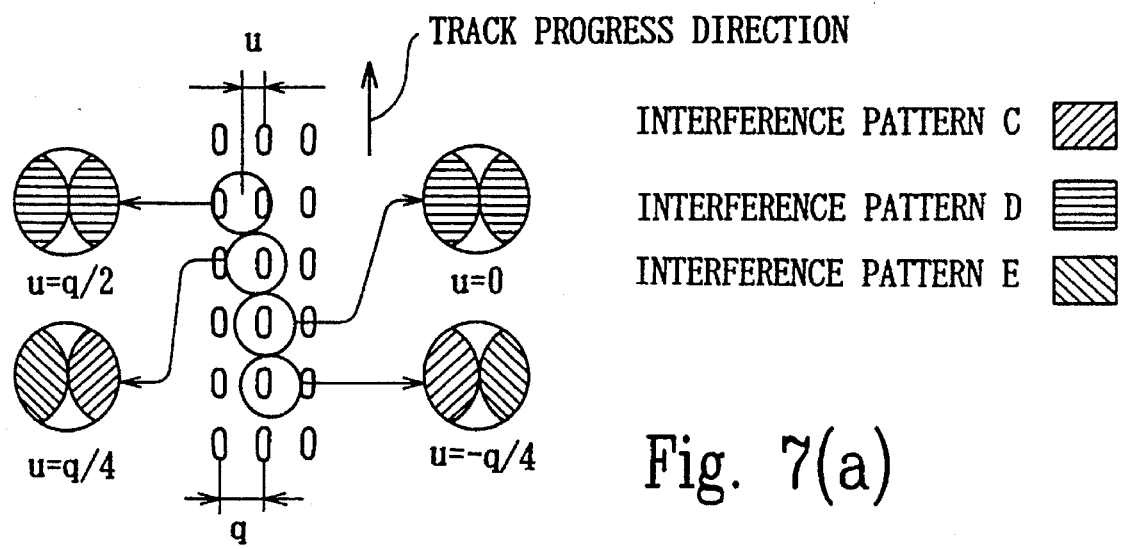

FIG. 7(a) shows interference patterns of the zero-order light and primary light of the diffracted light from a primary diffraction grating when changing the position of the light spot on the disk by assuming a track pit string (tracks) on the disk 7 as the primary diffraction grating. When assuming the relative displacement of the center of the light spot from the center of the track as "u" and the track pitch as "q", the interference patterns in the case of u=0 and u=q/2 are the same shape at the right and left sides. In the case of u=q/4 or u=−q/4, however, the shape of the interference pattern at the right side is reverse to that of the interference pattern at the left side. In this case, as the result of comparing the intensities of the rays reflected from the interference patterns C, D, and E converged on the photosensor 12, the intensity of the ray reflected from the interference pattern C is larger than that of the ray reflected from the interference pattern D and the intensity of the ray reflected from the interference pattern D is larger than that of the ray reflected from the interference pattern E.

Figure 7B:
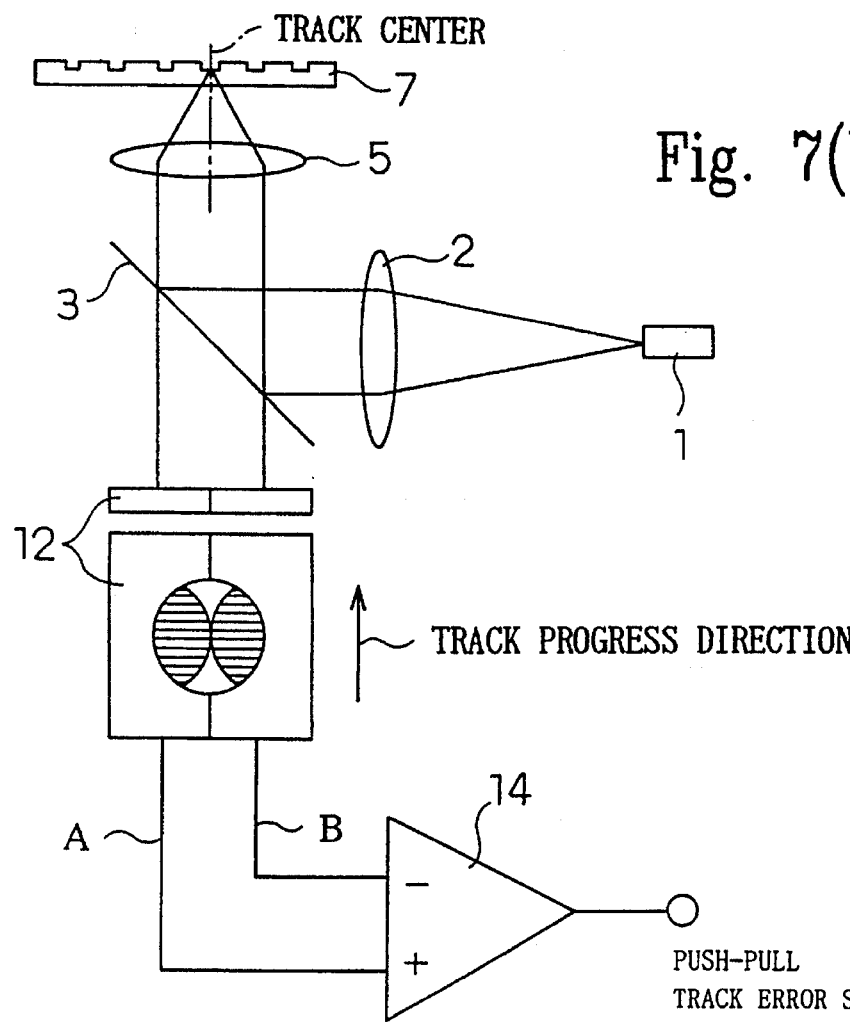

FIG. 7(b) shows a schematic view of a track error signal detecting optical system. When the interference patterns C, D, and E have the above relation, it is possible to detect a deviation of the center of the light spot from that of a track by arranging the split line of the two-split face of the photosensor 12 in parallel to the track and differential-detecting an output of the two-split face.

Figure 8:
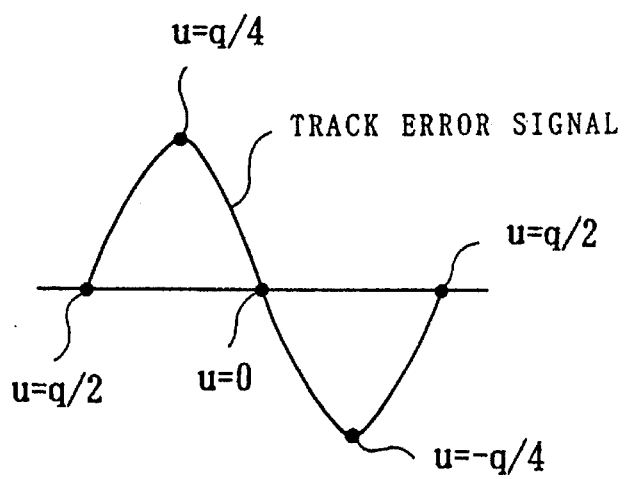
FIG. 8 is a diagram showing the position of a light spot on a disk and a track error signal waveform.

FIG. 8 shows a track error signal obtained by the push-pull method. In the case of u=0, the light spot is located at the center of the track and the track error signal coincides with the control criterion for tracking control. The track error signal comes to a positive peak in the case of u=q/4 and a negative peak in the case of u=−q/4. In the case of u=q/2, it is shown that the light spot is located between tracks. In other words, by computing the outputs from the split faces A and B of the photosensor 12 when the light spot crosses a track on the disk 7 by using the differential amplifier 14, the track error signal shown in FIG. 8 is obtained as the output of the amplifier. Moreover, the output of the two-split face of the photosensor 12 is inputted to the adding amplifier 16 as described above and a luminous energy sum signal corresponding to the luminous energy of the light beam reflected from the disk 7 can be obtained by the adding amplifier 16.

The operations of the entire optical system when tracking control is performed are described below by referring to FIG. 4. In the tracking control, the galvano-mirror recorder 19 serving as a fine actuator is mainly driven at a high frequency and a linear motor 20 serving as a coarse actuator is mainly driven at a low frequency. Moreover, retrieval by moving a light spot in a large range covering the entire area of the disk 7 is performed by driving the linear motor 20. This tracking control is performed after correction of an optical axis deviation and gain adjustment for correcting the offset of the track error signal to be described later in detail are completed. That is, for this embodiment, tracking control is performed after the galvano-mirror recorder 19 starts rotation by correcting an optical axis deviation while maintaining the state in which the optical axis of an optical system is aligned with the center of a light beam and the offset of the track error signal due to rotation of the galvano-mirror recorder 19 is canceled by gain adjustment.

The track error signal whose amplitude is kept almost constant by the divider 18 against a luminous energy change of the light beam or a reflectance change of the disk 7 is inputted to one input terminal of the differential amplifier 31. A signal in which the output of a sensor circuit is adjusted to a predetermined gain by a gain adjustment circuit 30 is inputted to the other input terminal of the differential amplifier 31. The output of the differential amplifier 31 is inputted to a phase compensation circuit 22. The output of the phase compensation circuit 22 is inputted to a driving circuit 26 through an adding circuit 32. Therefore, the galvano-mirror recorder 19 is rotated by the output of the driving circuit 26 corresponding to the track error signal. When the galvano-mirror recorder 19 rotates, the light spot moves in the direction crossing the tracks on the disk 7, that is, in the tracking direction. Thus, the light spot on the disk 7 is controlled so that it is continuously located at the track center.

The mirror 4 and object glass 5 are mounted on the linear motor 20. The mirror 4 and object glass 5 can be moved in the tracking direction from the inside to outside perimeters of the disk 7 in accordance with movement of the linear motor 20. Therefore, the light spot moves in the tracking direction from the inside to the outside perimeters of the disk 7 in accordance with movement of the linear motor 20. When tracking control is performed, the output of the phase compensation circuit 22 is transmitted to the linear motor 20 through an equivalent filter circuit 23, a phase compensation circuit 24 and a driving circuit 25 of the linear motor control system to control the linear motor 20 so that the galvano-mirror recorder 19 can rotate while maintaining the state in which the optical axis of the optical system is aligned with the center of the light beam. The equivalent filter circuit 23 has a characteristic almost equal to the input/output characteristic of the galvano-mirror recorder 19, that is, the rotational characteristic for the input to the galvano-mirror recorder 19.

The relation between optical axis deviation and track error signal offset is described below by referring to FIGS. 9 to 14.

The shape of the object glass 5 is rotation-symmetric around a reference axis. Moreover, the center of curvature of the spherical surface of the lens is aligned with the reference axis. This reference axis is defined as the optical axis of the object glass 5. Because elements other than the object glass 5 constituting an optical system are arranged so that the optical axis of the entire optical system is aligned with that of the object glass 5, image formation and related matters are completely the same even if the entire optical system rotates around the reference axis.

Figure 10:
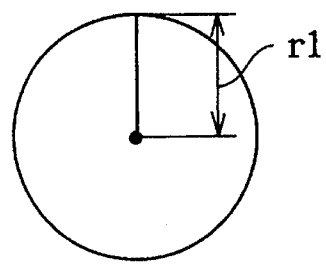
FIG. 10 shows an illustration of the shape of a light spot when there is no optical axis deviation.

FIG. 10 shows the cross section vertical to the optical axis of the light beam when the optical axis of the entire optical system is aligned with the center of the light beam entering the object glass 5. In other words, FIG. 10 shows the shape of the light spot on the disk 7 when no optical axis deviation occurs. The spread of luminous flux actually passing through the optical system is restricted by an aperture or lens rim. The influence for the luminous flux to receive when passing through the optical system depends on whether or not an image formation point is present on the optical axis. When the optical system is rotation-symmetric around the optical axis, luminous flux is also rotation-symmetric and the center of the luminous flux is aligned with the optical axis. In this case, the cross section vertical to the optical axis becomes circular as shown in FIG. 10. However, if the center of the light beam of parallel rays incident upon the object glass 5 is deviated from the optical axis, the light beam is not converged on one point due to the spherical aberration of the object glass 5.

Figure 11:
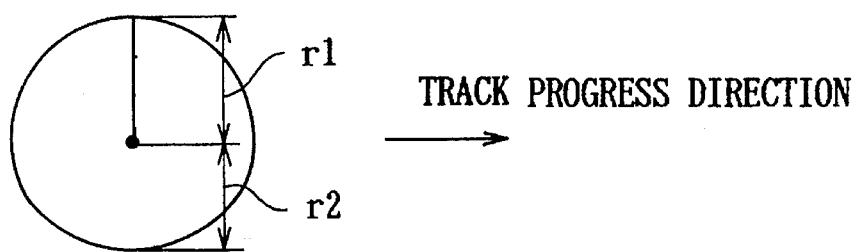
FIG. 11 shows an illustration for explaining a change of the shape of a light spot due to aberration or eclipse due to the lens rim when an optical axis deviation occurs.

A case in which a light beam enters the object glass 5 diagonally to the optical axis of an optical system is described below by referring to FIG. 11. FIG. 11 shows a cutting plane of the luminous flux vertical to the optical axis at a position on the same optical axis as that in FIG. 10 when the light beam enters the object glass 5 diagonally to the optical axis of the optical system. In other words, FIG. 11 shows the shape of a spot on the disk 7 when the light beam enters the object glass 5 diagonally to the optical axis of the optical system. In this case, the light beam is brought under the state in which it diagonally passes through a round hole with a thickness. Therefore, the cross section of the light beam does not become circular. Moreover, the area of the light beam decreases because of eclipse due to the lens rim. In short, the light beam has a coma aberration when it enters the object glass 5 diagonally to the optical axis. Therefore, when an optical axis deviation occurs, the shape of the light spot on the disk 7 changes due to spherical aberration of the object glass 5, coma aberration of luminous flux, and eclipse due to the lens rim.

Figure 9A:
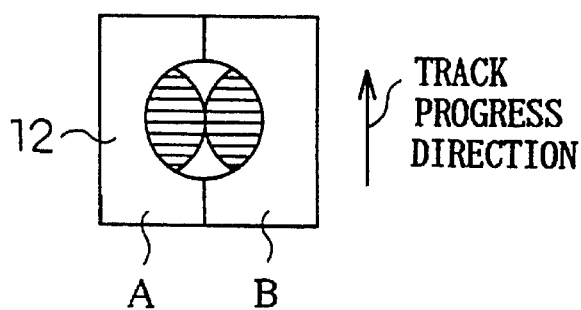
Figure 9B:
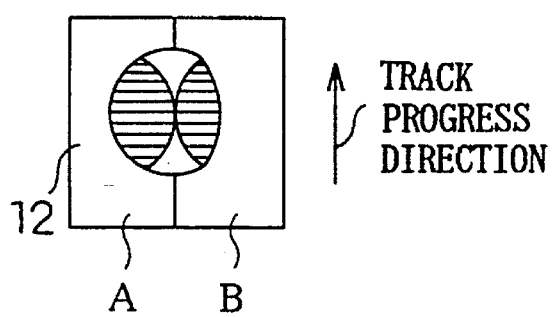
Figure 9C:
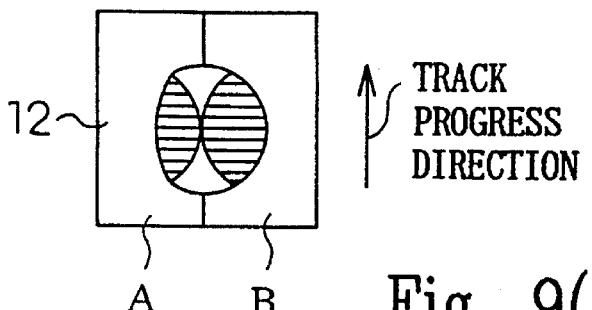

FIGS. 9(a) through 9(c) shows the relation between shape of a light spot on the photosensor 12 and optical axis deviation when the light spot is located on the track center. FIG. 9(a) shows the shape of the light spot on the photosensor 12 when no optical axis deviation occurs, FIG. 9(b) shows the shape of the light spot when an optical axis deviation occurs at an outside perimeter of the disk 7, and FIG. 9(c) shows the shape of the light spot when an optical deviation occurs at an inside perimeter of the disk 7.

When no optical axis deviation occurs, the light spot on the photosensor 12 has the shape shown in FIG. 9(a) and the outputs A and B of the two-split face of the photosensor 12 are equalized. However, when an optical axis deviation occurs, the light spot on the photosensor 12 has the shape shown in FIG. 9(b) or 9(c) though the light spot is located at the track center on the disk 7, and the outputs A and B of the two-split face of the photosensor 12 are not equalized. As a result, an offset occurs in the track error signal.

Figure 12:
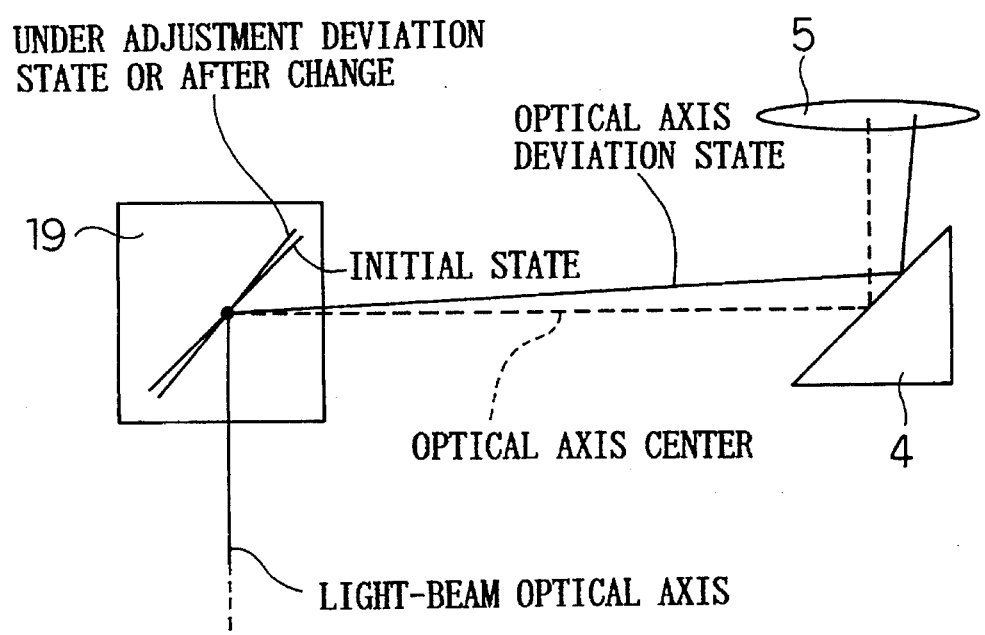
FIG. 12 shows an illustration for explaining an optical axis deviation due to a state change of a galvano-mirror recorder.

FIG. 12 shows an optical axis deviation when the attitude of the galvano-mirror recorder 19 changes in the rotational direction of the galvano-mirror recorder 19. When assuming the attitude of the galvano-mirror recorder 19 with no optical axis deviation as the initial state, the center of the light beam is deviated from the optical axis of the optical system when the galvano-mirror recorder 19 rotates counterclockwise (or clockwise).

Figure 13:
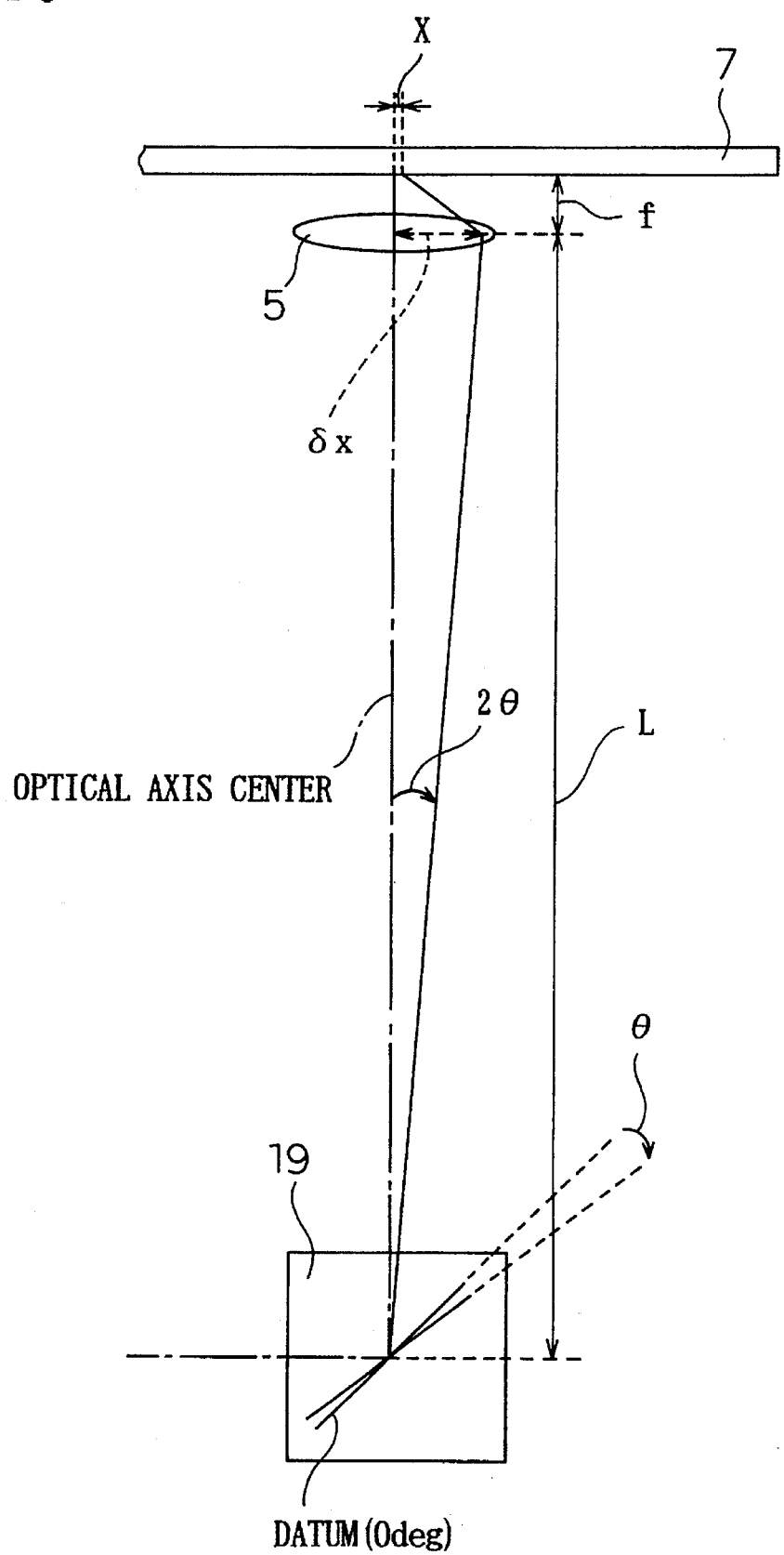
FIG. 13 shows an illustration for explaining the relation between rotation and optical axis deviation of a galvano-mirror recorder omitting a mirror 4 for easy understanding.
Figure 14:
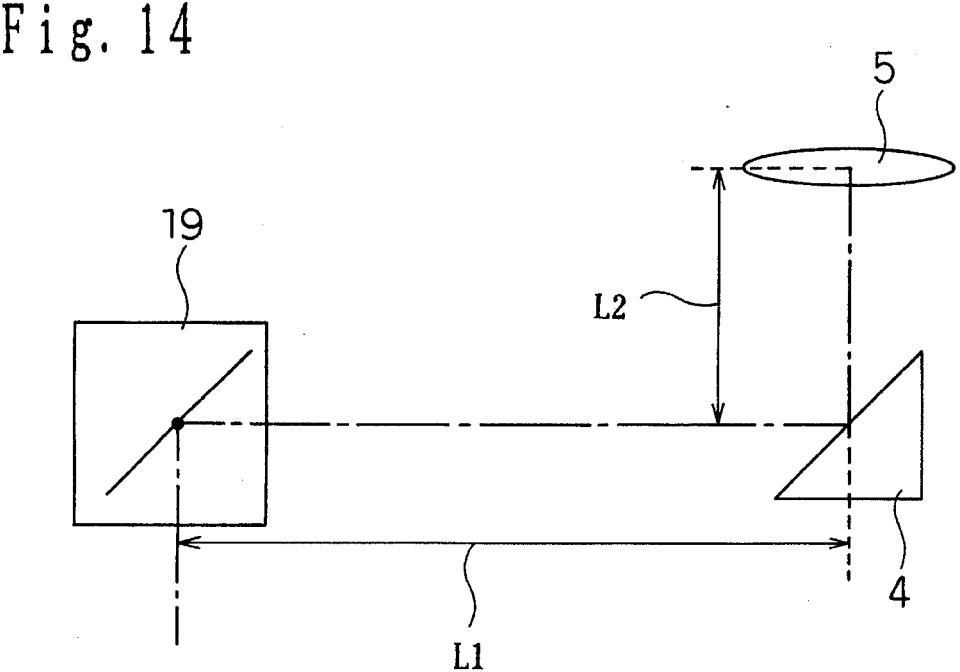
FIG. 14 shows an illustration for explaining the optical-path length in the embodiment.

The relation between the optical path length from the galvano-mirror recorder 19 to the object glass 5 the rotation angle of the galvano-mirror recorder 19, and the optical axis deviation is described below by referring to FIGS. 13 and 14. FIG. 13 shows the relation between rotation angle θ of the galvano-mirror recorder and the optical path length L, deviation value δx of the center of the light beam from the optical axis of the optical system (hereafter referred to as the optical axis deviation value), and moving distance of x of the light spot on the disk 7. FIG. 14 shows distance L1 from the galvano-mirror recorder 19 to the mirror 4, distance L2 from the mirror 4 to the object glass 5, and optical path length L.

The following are relational expressions (1), (2), (3), (4), and (5) about the rotation angle θ of the galvano-mirror recorder 19, the optical path length L, the optical axis deviation value δx, and the moving distance x of the light spot.

$$L=L1+L2 \tag{1}$$

The expression (1) represents that the distance L from the galvano-mirror recorder 19 to the object glass 5 (optical path length) is the sum of the distance L1 from the galvano-mirror recorder 19 to the mirror 4 and the distance L2 from the mirror 4 to the object glass 5.

$$f=3 \text{ mm} \tag{2}$$

The expression (2) represents the focal distance f of the object glass 5.

$$f^* \operatorname{Sin}(2\theta)=x \tag{3}$$

The expression (3) is a relational expression about the focal distance f of the object glass 5, the rotation angle θ of the galvano-mirror recorder 19, and the moving distance x of the light spot.

$$2\theta = A \operatorname{Sin}(x/f) \tag{4}$$

The expression (4) is an expression obtained by expanding the expression (3) about the angle 2θ which is two times as large as the rotation angle θ of the galvano-mirror recorder 19.

$$\delta x = L \max {}^* \tan(2\theta) \tag{5}$$

The expression (5) is a relational expression about the optical axis deviation value δx, the maximum optical-path length Lmax, and the rotational angle θ of the galvano-mirror recorder 19. For this embodiment, the maximum optical-path length Lmax is 70 mm. Therefore, for example, when the galvano-mirror recorder 19 rotates by plus/minus 0.0955 deg, the light spot moves by plus/minus 10 μm on the disk 7 in accordance with the expressions (2) and (3). In this case, the optical axis deviation value 6 x is obtained as plus/minus 0.233 mm from the expression (5).

Figure 15:
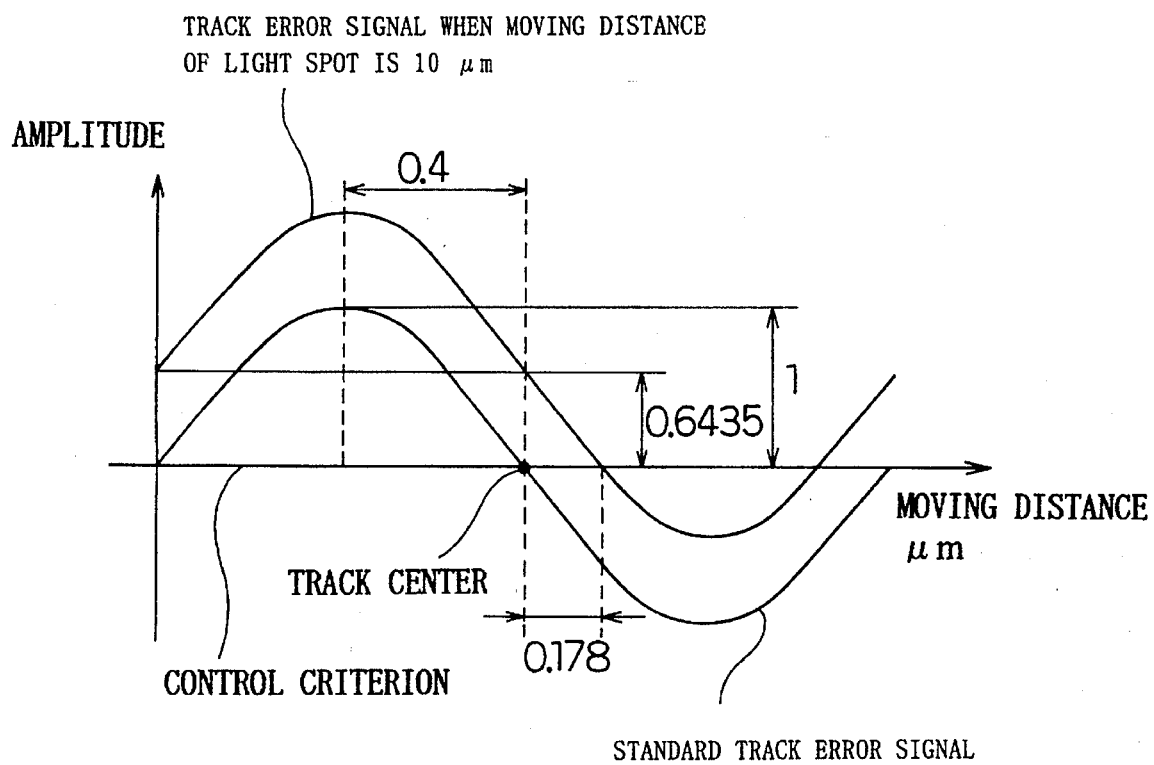
FIG. 15 shows an illustration for explaining the relation between the moving distance of a light spot on a disk and the offset of a track error signal.
Figure 17:
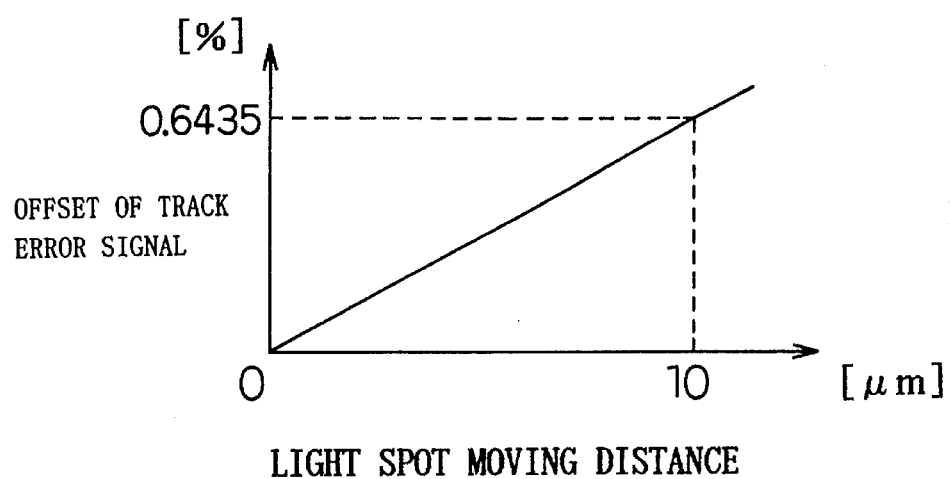
FIG. 17 is a characteristic diagram showing the relation between offset of a track error signal and moving distance of a light spot in the embodiment.

FIG. 15 shows a track error signal when no optical axis deviation occurs (i.e., the reference track error signal) and a track error signal when a light spot moves by 10 μm on the disk 7. When assuming the amplitude of the track error signal as plus/minus 1, an offset of plus/minus 0.6435 occurs in the track error signal when the central axis of a light beam deviates from the optical axis by plus/minus 0.233 mm. When the offset of plus/minus 0.6435 occurs in the track error signal, the tracking control system controls the light spot so that it is located at a position plus/minus 0.178 μm apart from the track center. Therefore, when the maximum optical-path length Lmax from the galvano-mirror recorder 19 to the object glass 5 increases, it is found that the offset of the track error signal also increases.

A photosensor 21 for detecting a rotation angle of the galvano-mirror recorder 19 serving as a fine actuator is described below by referring to FIGS. 4, 5, and 6.

Figure 5:
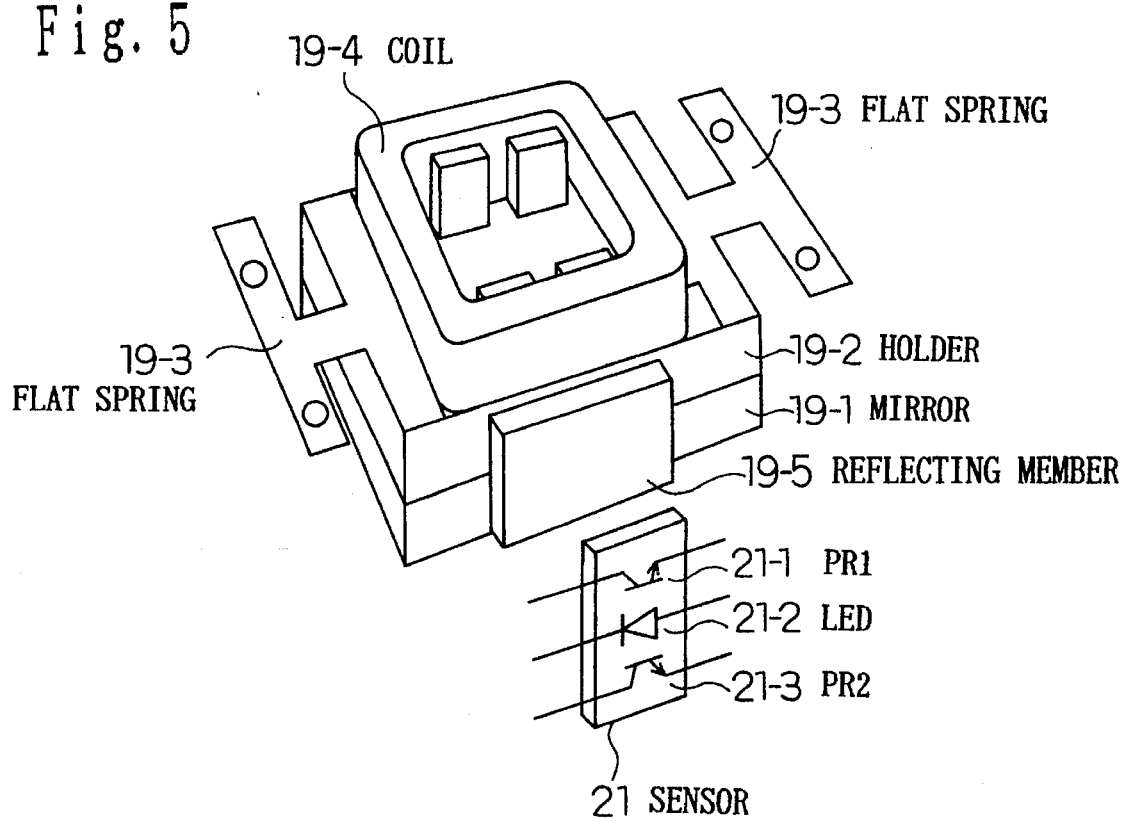
FIG. 5 is a perspective view showing the galvano-mirror recorder and reflection-type photosensor of the embodiment of the present invention.

FIG. 5 shows the galvano-mirror recorder 19 and the photosensor 21. In FIG. 5, a mirror 19-1 is bonded to one-side face (mirror face) of a holder 19-2 of the galvano-mirror recorder 19. A flat spring 19-3 is bonded to the opposite side to the mirror face of the holder 19-2 and moreover, a coil 19-4 is bonded and secured onto the flat spring 19-3. The opposite side to the holder 19-2 of the flat spring 19-3 is secured to a stationary part. When tracking control is performed, the galvano-mirror recorder rotates to perform tracking due to the interaction between a magnet (not illustrated) at the stationary part and magnetism caused by the current flowing through the coil 19-4. A reflecting member 19-5 is securely bonded to the lateral side of the holder 19-2 and mirror 19-1. A sensor adjusted so that a desired signal can be obtained when the galvano-mirror recorder 19 is not controlled is secured to the stationary part facing the reflecting member 19-5. The sensor comprises two photoreflectors (PR1 and PR2) 21-1 and 21-3 and an LED 21-2.

Figure 6:
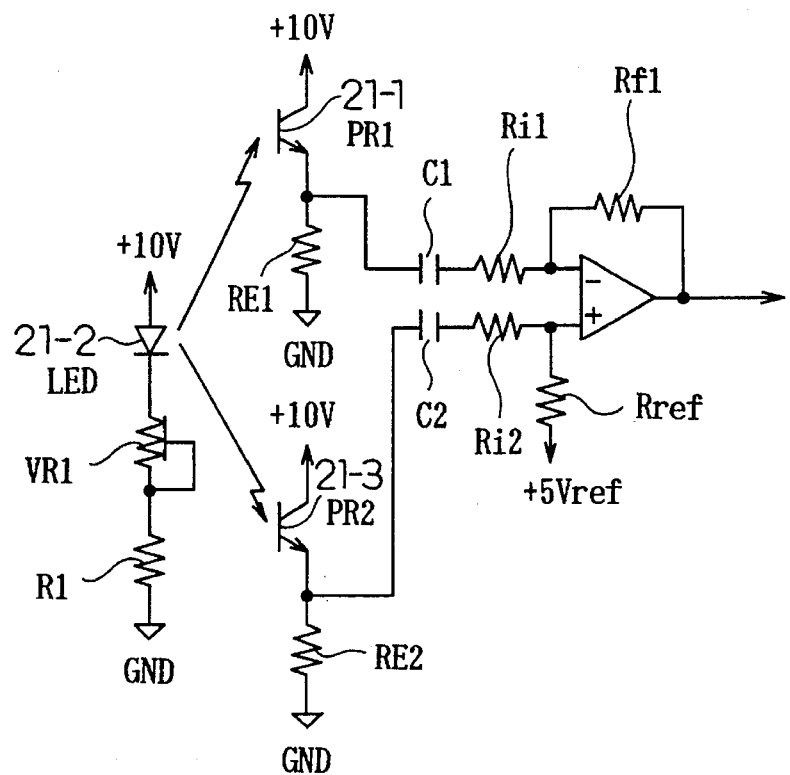
FIG. 6 is a circuit diagram showing the sensor circuit of the embodiment of the present invention.

FIG. 6 shows a driving circuit for the LED 21-2 for the sensor and a detecting and differential amplifier for the photoreflectors (PR1 and PR2) 21-1 and 21-3. The anode terminal of the LED 21-2 is connected to a +10 V line and the cathode terminal of it is connected to a GND line through a variable resistor VR1 and a resistor R1. The current flowing through the LED 21-2 is controlled by adjusting the VR1. The collector terminal of the photoreflector (PR1) 21-1 is connected to a +10-V line and the emitter terminal of it is connected to a GND line through a resistor RE1. The collector terminal of the photoreflector (PR2) 21-3 is connected to a +10-V line and the emitter terminal of it is connected to a GND line through a resistor RE2. The connection point between the photoreflector (PR1) 21-1 and the RE1 connects with the negative input terminal of an operational amplifier through a capacitor (C1) and a resistor (Ri1) and the connection point between the photoreflector (PR2) 21-3 and the RE2 connects with the positive input terminal of the operational amplifier through a capacitor (C2) and a resistor (Ri2). The negative input terminal of the operational amplifier is connected to the output terminal of the operational amplifier through a resistor (RF1) and the positive input terminal is connected to a +5-Vref line through a resistor (Rref). The light emitted from the LED 21-2 is reflected by the reflecting member 19-5 secured to the lateral of the mirror. The reflected light is detected by the photoreflector (PR1) 21-1 and the photoreflector (PR2) 21-3 to convert the light into a voltage, and its DC component is cut off by the capacitors (C1 and C2), and thereafter the voltage is differential-amplified by the operational amplifier. As a result, a sensor detection signal corresponding to the rotation angle of the galvano-mirror recorder 19 is obtained as the output of the operational amplifier.

FIGS. 16(a) to 16(c) show a sensor signal and track error signals when driving the galvano-mirror recorder 19. FIG. 16(a) shows a waveform of the sensor signal, FIG. 16(b) shows a waveform of the track error signal before off-track correction, and FIG. 16(c) shows a waveform of the track error signal after off-track correction. After the installation position of the sensor 21 is adjusted and the driving current for the LED 21-2 is set, the sensor output changes by plus/minus 100 mV when the light spot is moved on the disk 7 by plus/minus 1 μm due to rotation of the galvano-mirror recorder 19. In short, the sensor sensitivity is 100 mV/μm. By driving the galvano-mirror recorder 19 with a sine-wave signal outputted by a driving signal generation circuit 33, the sensor signal waveform shown in FIG. 16(a) and the track error signal waveform shown in FIG. 16(b) are obtained before off-track correction. Because the track error signal waveform in FIG. 16(b) crosses approx. plus/minus five tracks, the moving distance of the light spot on the disk 7 is approx. 8 μm because the track pitch is 1.6 μm. Therefore, it is found that the sensor signal changes by approx. plus/minus 0.8 V. In this case, it is preferable that the frequency of the sine-wave signal outputted by the driving signal generation circuit is approx. 1 KHz in order to decrease the influence of eccentricity or the like of the disk 7.

Then, the description is made below about deviation of a track position caused by an offset of a track error signal against the position of a light spot applied to a track on the disk 7, in other words, correction of off-track in accordance with detection of deviation of the optical axis of an optical system from the center of a light beam, that is, detection of an optical axis deviation and with the detected optical axis deviation by referring to FIGS. 4 to 19.

When the center of the light beam is greatly deviated from the optical axis of the optical system due to a change of the attitude of the galvano-mirror recorder 19 and approaches the outer ring of the object glass 5, rays entering and reflected by the disk 7 are subject to eclipse or the like due to the rim of the object glass. Therefore, one of the outputs A and B of the two-split face of the photosensor 12 becomes dominant and the track error signal hardly appears. In this case, it is impossible to securely execute tracking control and start the recording/reproducing apparatus. Thus, off-track correction of the present invention is performed.

A circuit for performing off-track correction comprises a sensor 21, a sensor circuit 29, and a gain adjustment circuit 30, which is connected to the negative input terminal of the differential amplifier 31. As previously described, when the galvano-mirror recorder 19 is rotated, an offset occurs in the track error signal which is the output of the divider 18 in accordance with a rotation angle of the galvano-mirror recorder 19 (or in accordance with a moving distance of the light spot on the disk 7). Therefore, a track error signal excluding the offset generated due to rotation of the galvano-mirror recorder 19 can be obtained as the output of the differential amplifier 31 by subtracting a gain-adjusted sensor output signal at the negative input terminal from the track error signal at the positive input terminal. In this case, because the DC component of the sensor 21 is cut off by the sensor circuit 29 in order to prevent the DC component of the sensor output from changing due to temperature drift of the sensor 21, offset correction is effective at a band of a cutoff frequency (fc) of 34 Hz determined by the capacitor (C1) and photoreflector (PR1) 21-1 and the capacitor (C2) and photoreflector (PR2) 21-3 of the sensor circuit 29 or higher.

Figure 18A:
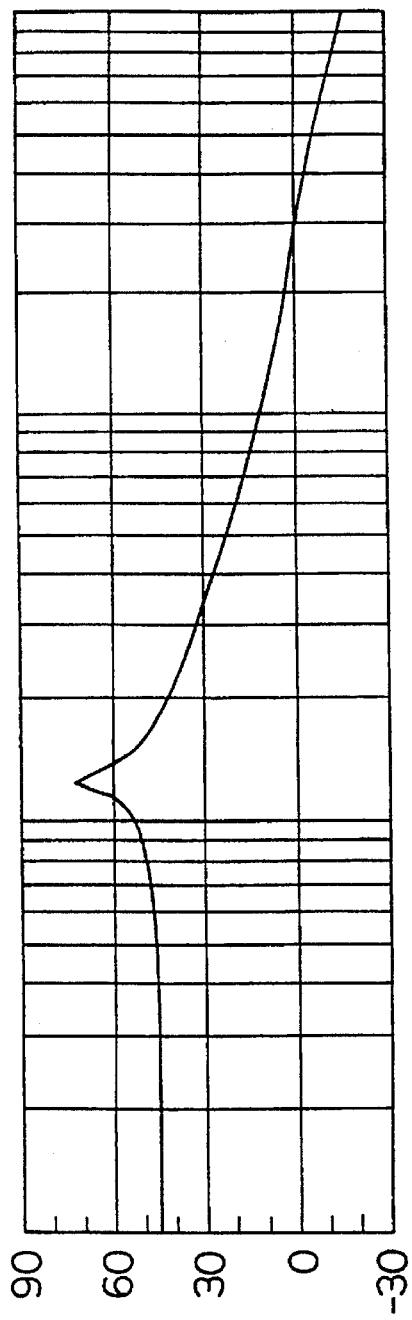
FIGS. 18(a) and 18(b) show Bode diagrams of the open-loop frequency characteristic of the TR servo of the embodiment.
Figure 18B:
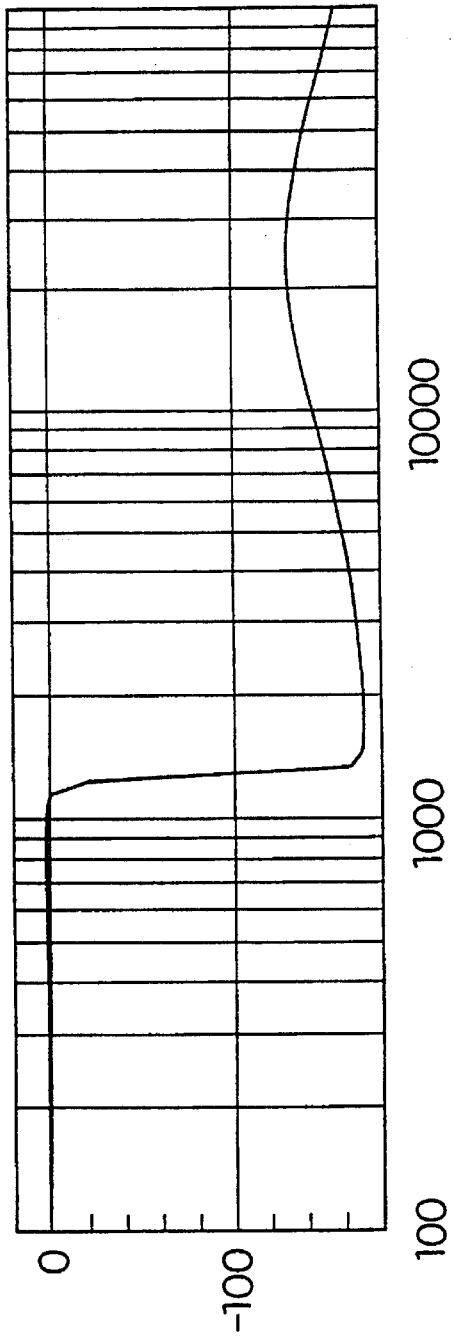

FIGS. 18(a) and 18(b) show Bode plots of the servo loop (TR servo loop) for driving and controlling the galvonometer recorder 19.

FIGS. 19(a) and 19(b) shows Bode plots of the servo loop (TRS servo loop) for driving and controlling the linear motor 20.

The gain intersection point of the TR servo loop is set to 4 KHz and that of the TRS servo loop is set to 450 Hz. At a frequency of 450 Hz or lower, the linear motor 20 mainly operates to perform tracking control. Assuming the servo tolerance of a tracking system as plus/minus 0.08 μm, the light spot on the disk 7 moves up to approx. plus/minus 10 μm due to rotation of the galvano-mirror recorder 19 when tracking is performed because the primary resonance frequency (fo) of the galvano-mirror recorder 19 is 200 Hz. When the light spot on the disk 7 moves by plus/minus 10 μm while tracking is performed, a track error signal is off-tracked by plus/minus 78 μm calculated in terms of the moving distance of the light spot on the disk 7. However, it is possible to keep the off-track tolerance of a tracking servo system within plus/minus 0.02 μm by performing the off-track correction of the present invention. To execute the tracking servo operation, the light spot on the disk 7 moves by plus/minus 10 μm or more. However, it is possible to securely execute the tracking servo system operation by performing off-track correction and thereby canceling the offset of the track error signal due to movement of the galvano-mirror recorder 19 so that the off-track tolerance is kept within plus/minus 0.02 μm for the track center on the disk 7. Moreover, even if the galvano-mirror recorder 19 rotates when no tracking control is performed, the symmetry of the track error signal is not degraded or the track error signal does not disappear. Therefore, track error signals are not erroneously counted in retrieval and it is possible to accurately count track error signals for a purposed track.

Automatic adjustment of an off-track correction gain is described below by referring to FIGS. 4 and 16(*a*) through 16(*c*). First, the adjustment of the off-track correction gain is performed by turning on a focus servo. The galvano-mirror recorder 19 is rotated by the galvano-mirror recorder 19 driving circuit 26 through the adding circuit 32 so that a light spot on the disk 7 moves by approx. plus/minus 10 μm in accordance with a sine-wave signal outputted from the driving signal generator 33. The track error signal outputted from the differential amplifier 31 when rotating the galvano-mirror recorder 19 is inputted to a CPU 35 through an A-D converter 34. The CPU 35 performs the operation for obtaining the maximum and minimum values of the track error signal inputted through the A-D converter 34 to detect the asymmetry of the track error signal. The CPU 35 adjusts the set gain value of the gain adjustment circuit 30 through a D-A converter 136 so that the track error signal outputted from the differential amplifier 31 becomes symmetric. Thus, by adjusting the gain for off-track correction, the track error signal when driving the galvano-mirror recorder 19 with a signal sent from the driving signal generation circuit 33 changes its waveform shown in FIG. 16(*b*) to the waveform shown in FIG. 16(*c*).

As described above, it is possible to improve the tracking control accuracy for recording or reproducing data by correcting the off-track generated due to rotation of the galvano-mirror recorder 19 during tracking control. Moreover, the tracking servo operation can securely be executed so that the off-track tolerance is kept within plus/minus 0.02 μm for the track center on the disk 7 by performing off-track correction to cancel the offset of the track error signal due to movement of the galvano-mirror recorder 19. Furthermore, even if the galvano-mirror recorder 19 rotates when no tracking control is performed, the symmetry of the track error signal is not degraded or the track error signal does not disappear. Therefore, track error signals are not erroneously counted in retrieval and it is possible to accurately count track error signals for a purposed track.

Moreover, by automatically adjusting the off-track correction gain so that the off-track tolerance of the track error signal outputted from the differential amplifier is kept within plus/minus 0.02 μm, off-track correction can securely be performed even if the sensor sensitivity or off-track characteristic fluctuates. Furthermore, because the DC component of 34 Hz or lower is cut off in the sensor circuit 29 as the constituent of the sensor 21, off-track correction is not subject to the temperature drift or the like of the sensor 21. Thus, because the constituents and adjustment of the sensor 21 are simple and a desired off-track correction effect is obtained, the productivity is improved in the mass production of the recording/reproducing apparatus.

The above embodiment uses the galvano-mirror recorder 19 as means for changing the light beam direction. However, it is also possible to use, for example, means using a prism as long as the means comprises a system for moving the light beam in a circular pattern.

The above embodiment uses the linear motor 20 as a coarse actuator. However, it is also possible to use an apparatus comprising other systems such as a swing arm.

The above embodiment uses a constituent for correcting a correction value by adjusting the gain of the gain adjustment circuit 30 in order to eliminate error of the symmetry of the track error signal. However, it is also possible to use a constituent for correcting a rotation angle signal of the output of the sensor 21 or sensor circuit 29. Or, it is also possible to use a constituent for correcting the track error signal inputted to the differential amplifier.

The above embodiment uses a constituent comprising the gain adjustment circuit 30, A-D converter 34, CPU 35, and D-A converter 136. However, it is also possible to use a constituent free from these circuits.

The above embodiment uses the CPU 35 as symmetry detecting means. However, it is also possible to use exclusive hardware having the same function as the CPU 35.

For the above embodiment, the correcting means and the driving controlling means comprise exclusive hardware. However, it is also possible to realize the same functions through software by using a computer.

(Second Embodiment)

The second embodiment of the tracking controller of the present invention is described below by referring to FIGS. 20 to 23(*c*). The tracking control in this embodiment is performed similarly to that in the first embodiment. Therefore, the description of it is omitted.

First, a lock servo of a galvano-mirror recorder 19 of this embodiment is described below by referring to FIGS. 20 and 21.

Figure 20:
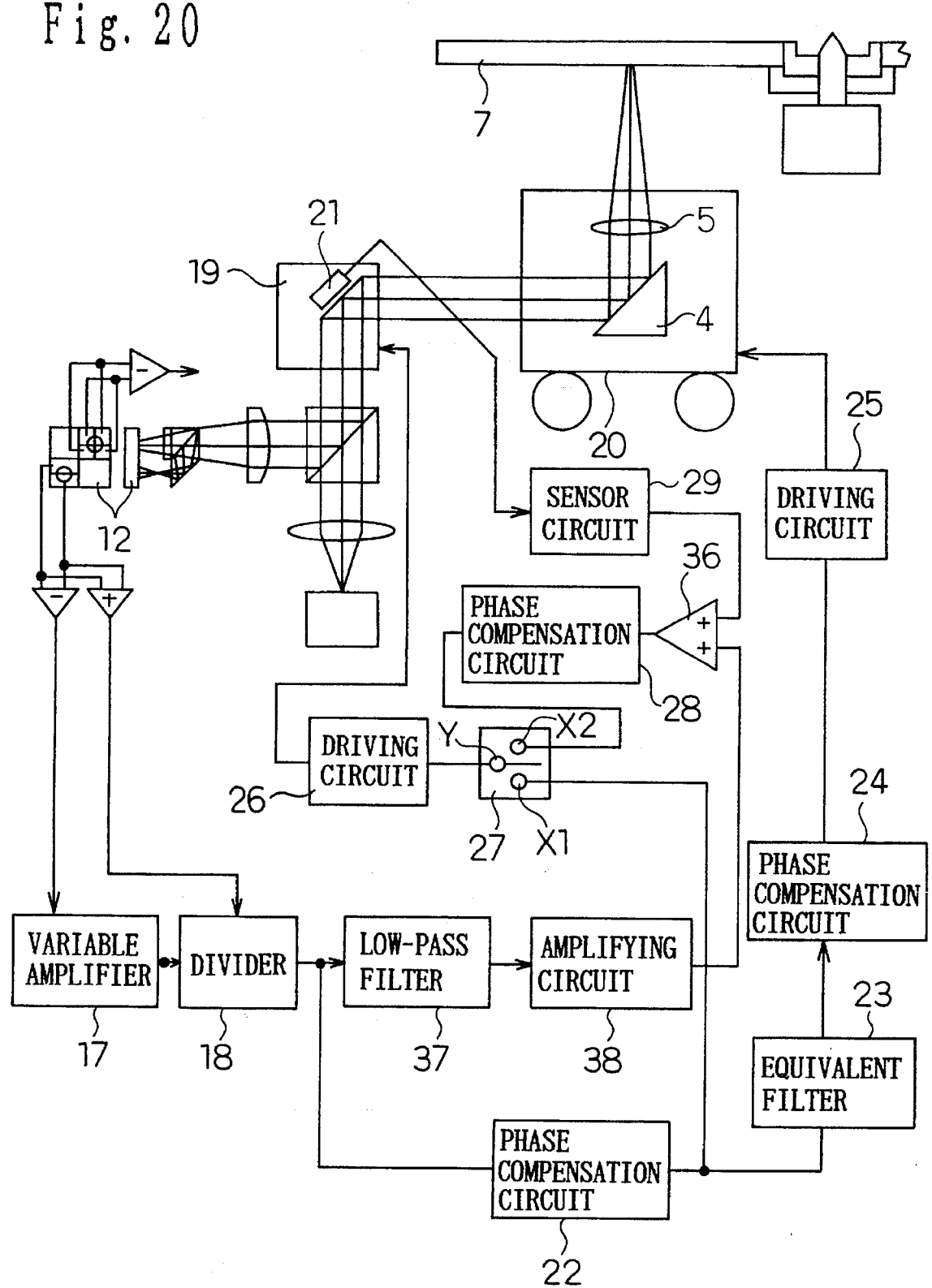
FIG. 20 is a block diagram showing the constituents of a tracking controller for explaining the second embodiment of the present invention.

FIG. 20 is a block diagram showing the constituents of the second embodiment. A component the same as that in the first embodiment is provided with the same symbol and its description is omitted. FIG. 21 is a block diagram of the lock servo of the second embodiment.

Figure 21:
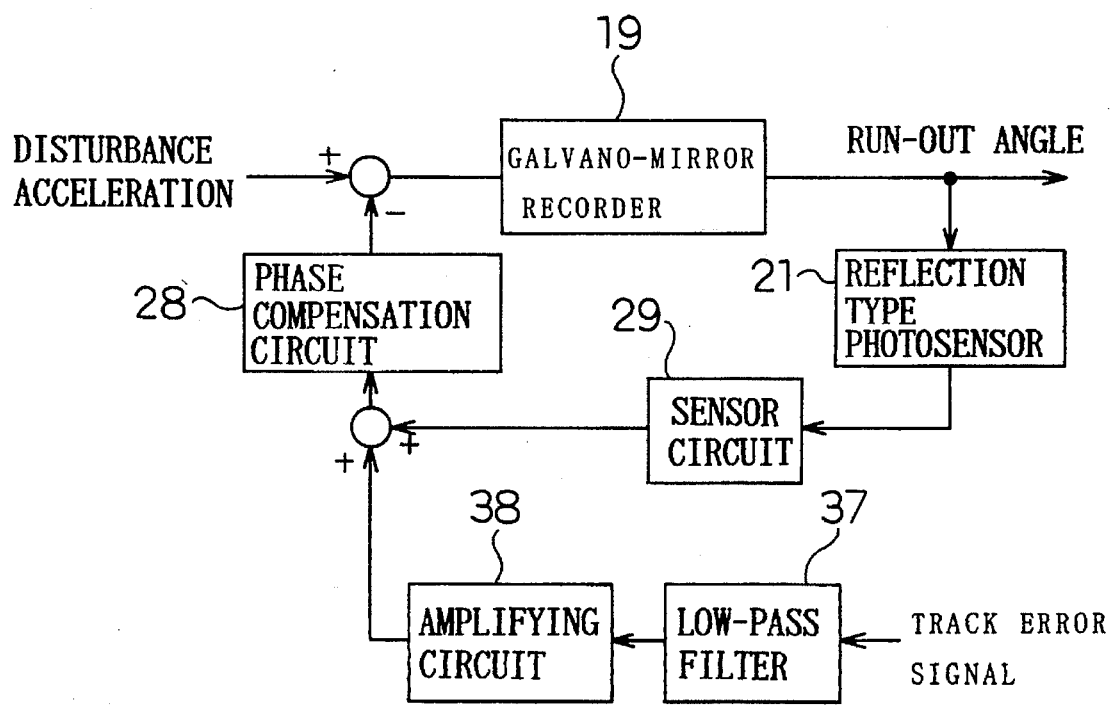
FIG. 21 is a block diagram for explaining the lock servo of the second embodiment of the present invention.

For the second embodiment of the present invention, a rotation angle of the galvano-mirror recorder 19 is detected by a reflection-type photosensor 21 and thereafter the DC component of an output signal of the reflection-type photosensor 21 is cut off by a DC cut filter of a sensor circuit 29 as shown in FIGS. 20 and 21. Moreover, a track error signal which is an output of a divider 18 is inputted to a low-pass filter 37 to extract the DC offset component of the track error signal. The extracted DC offset component of the track error signal is gain-adjusted by an amplifying circuit 38. The gain of the amplifying circuit 38 is set to a value suitable for correcting an optical axis deviation due to rotation of the galvano-mirror recorder 19. The gain-adjusted DC offset component of the track error signal and the rotation angle detection signal of the galvano-mirror recorder 19 cutting off the DC component are added by an adding amplifier 36 serving as adding means and phase-compensated by a phase compensation circuit 28 for compensating the phase at the gain intersection point of a lock servo for securing the galvano-mirror recorder 19 to a desired position. The phase-compensated signal is returned to the negative input terminal of driving circuit 26 for driving the galvano-mirror recorder 19 through a signal selection circuit 27. When the lock servo operation is executed, the signal selection circuit 27 selects an output signal of the phase compensation circuit 28 of the lock servo. Meanwhile the output from the sensor circuit 29 can be directly input to the phase compensation circuit 28.

Figure 22A:
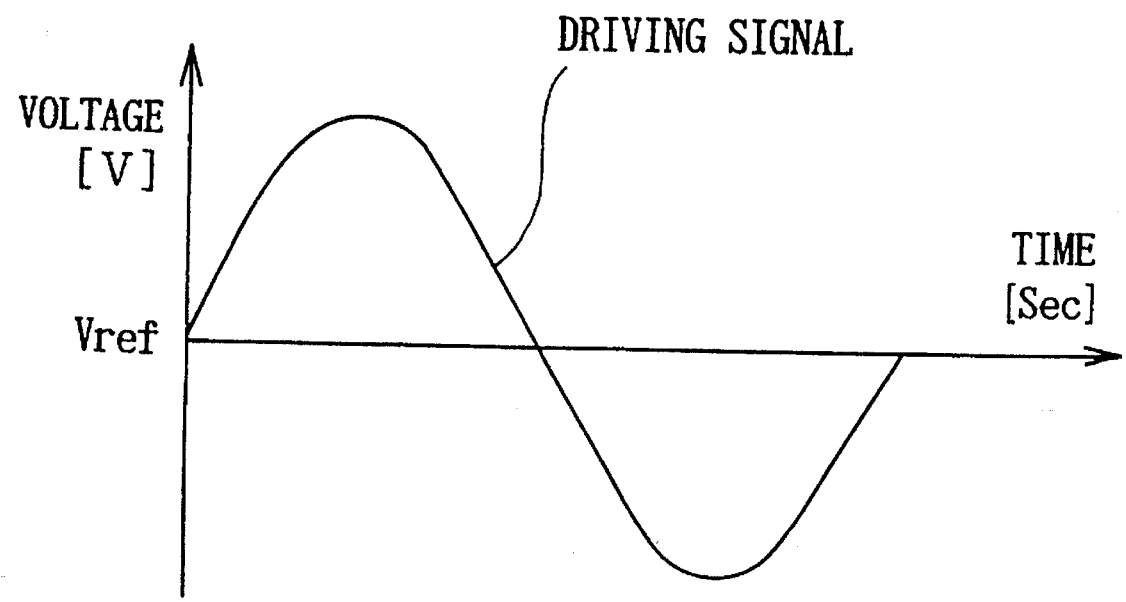
Figure 22B:
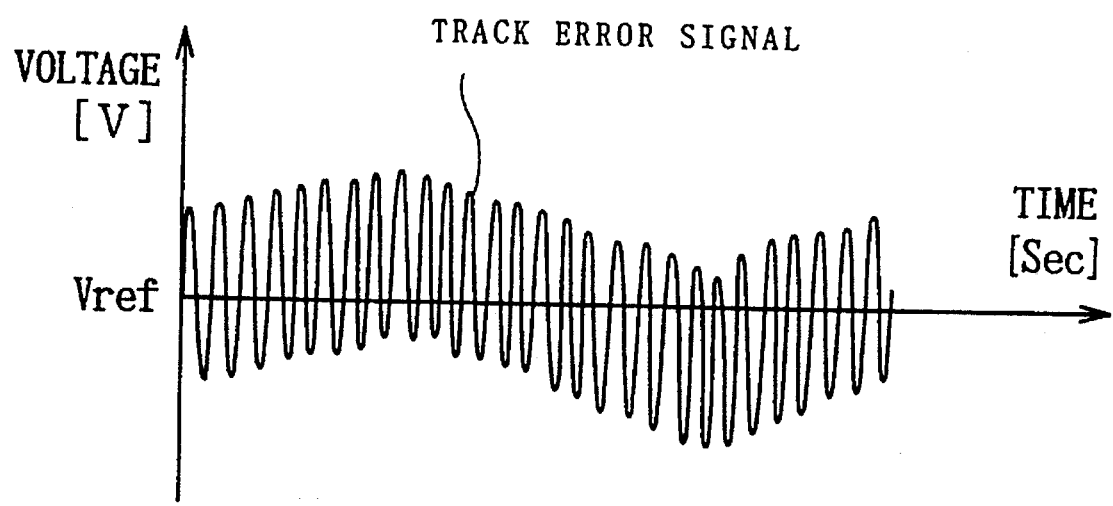
Figure 23A:
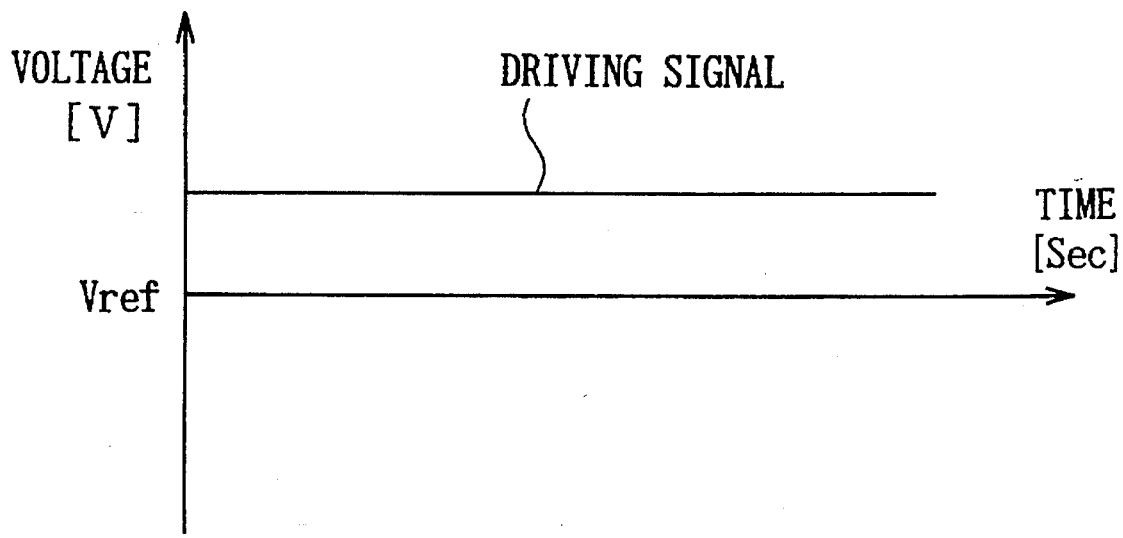
Figure 23B:
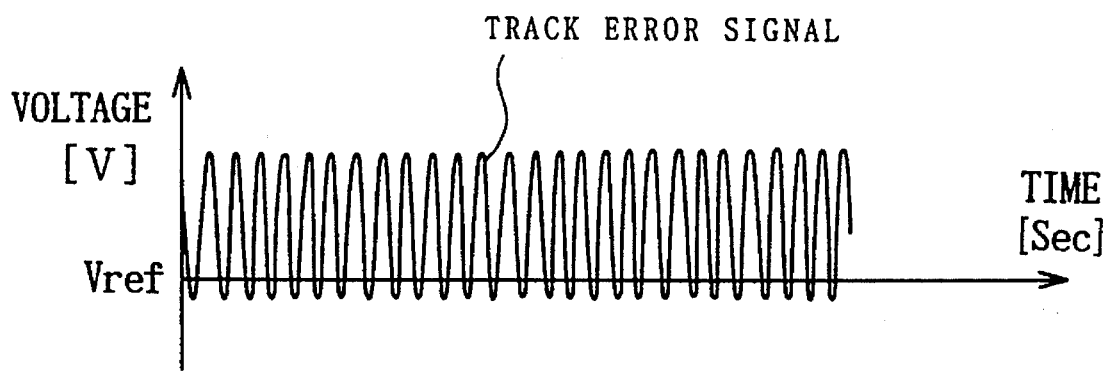
Figure 23C:
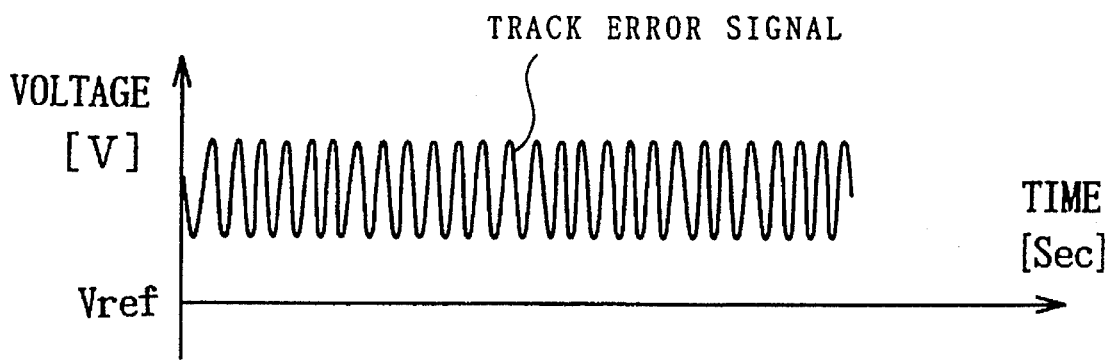

A change of the locking state of the galvano-mirror recorder 19 is described below by using a track error signal waveform when driving the galvano-mirror recorder 19 as an example. FIGS. 22(*a*) and 22(*b*) show driving signal and track error signal waveforms when driving the galvano-mirror recorder 19 with a sine-wave signal. When driving the galvano-mirror recorder 19 with the sine-wave signal shown in FIG. 22(*a*), the track error signal also causes a sine-wave swell as shown in FIG. 22(*b*). That is, the track error signal causes an offset due to rotation of the galvano-mirror recorder 19. FIGS. 23(*a*) to 23(*c*) show driving signal and track deviation waveforms when driving the galvano-mirror recorder 19 with a DC signal. When driving the galvano-mirror recorder 19 with the DC signal shown in FIG. 23(*a*), the track error signal is offset in accordance with the DC signal values shown in FIGS. 23(*b*) and 23(*c*). FIG. 23(*b*) shows a case where a DC driving value is comparatively small and FIG. 23(*c*) shows a case where the DC driving value is comparatively large. When the DC driving value is large, not only the track error signal causes an offset but the amplitude of the signal also decreases. However, by executing the present invention, it is possible to clock the galvano-mirror recorder 19 at a position where no offset occurs in the track error signal.

(Third Embodiment)

The third embodiment of the tracking controller of the present invention is described below by referring to FIGS. 24 and 25. The tracking control in this embodiment is performed similarly to that in the first embodiment. Therefore, the description of it is omitted.

Figure 24:
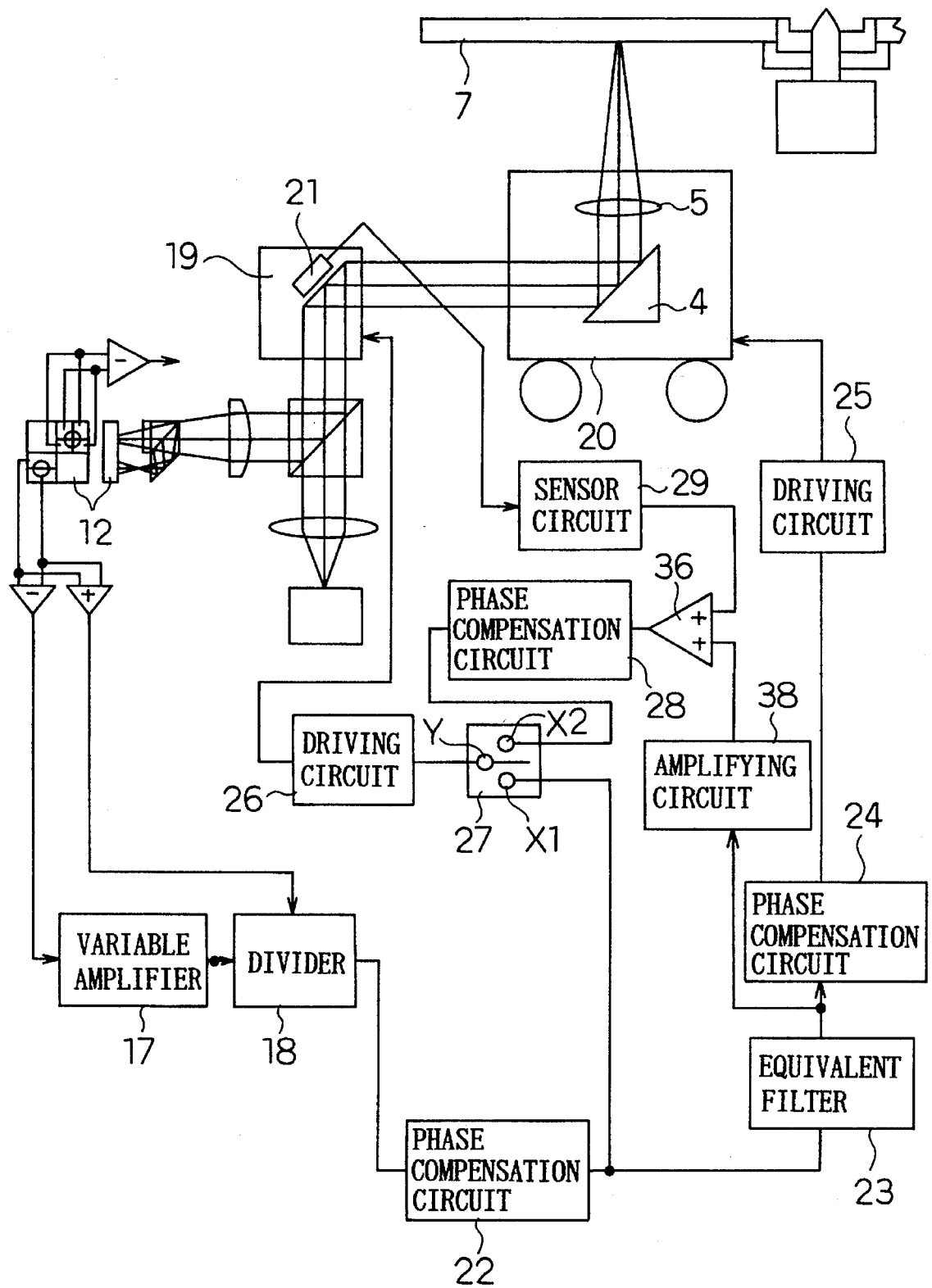
FIG. 24 is a block diagram showing the constituents of a tracking controller for explaining the third embodiment of the present invention.
Figure 25:
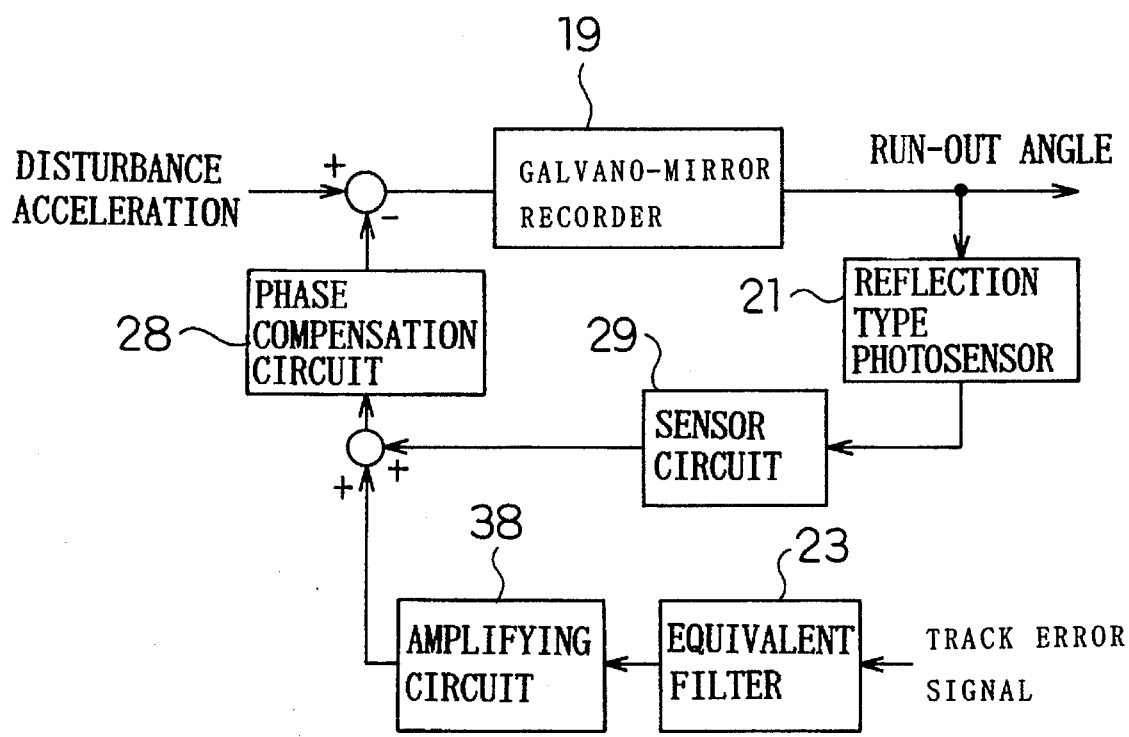
FIG. 25 is a block diagram for explaining the lock servo of the third embodiment of the present invention.

First, a lock servo of a galvano-mirror recorder 19 in this embodiment is described by referring to FIGS. 24 and 25.

FIG. 24 is a block diagram showing the constituents of this embodiment. A component same as that in the first embodiment is provided with the same symbol and its description is omitted. FIG. 25 is a block diagram of the lock servo in the third embodiment.

A difference between the second and third embodiments lies in the lock servo of the galvano-mirror recorder 19. As shown in FIG. 24, the third embodiment is constituted so as to extract a DC offset of a track error signal by using an equivalent filter 23 of a control loop of a linear motor 20 though the second embodiment uses a low-pass filter to extract the DC offset component of the track error signal. Others features are the same as the second embodiment and the extracted DC offset component of the track error signal is gain- adjusted by an amplifying circuit 38. The gain of the amplifying circuit 38 is set to a value suitable for correcting an optical axis deviation due to rotation of the galvano-mirror recorder 19. The gain- adjusted DC offset component of the track error signal and a rotation angle detection signal of the galvano-mirror recorder 19 cutting off the DC component are added by an adding amplifier 36 and phase-compensated by a phase compensation circuit 28 and thereafter returned to the negative input terminal of a driving circuit 26 for driving the galvano-mirror recorder 19 through a signal selection circuit 27. When the lock servo operation is executed, the signal selection circuit 27 selects an output signal of the phase compensation circuit 28 for the lock servo operation.

The third embodiment is constituted so as to extract the low-frequency component of the track error signal by using the equivalent filter of the control loop of the linear motor 20 instead of the low-pass filter of the second embodiment. Therefore, the constituents of the third embodiment can be simplified because the low-pass filter can be omitted.

(Fourth Embodiment)

The fourth embodiment of the tracking controller of the present invention is described below by referring to FIGS. 26 and 27. The tracking control in this embodiment is performed similarly to that in the first embodiment. Therefore, the description of it is omitted.

First, a lock servo of a galvano-mirror recorder 19 in this embodiment is described below by referring to FIGS. 26 and 27.

Figure 26:
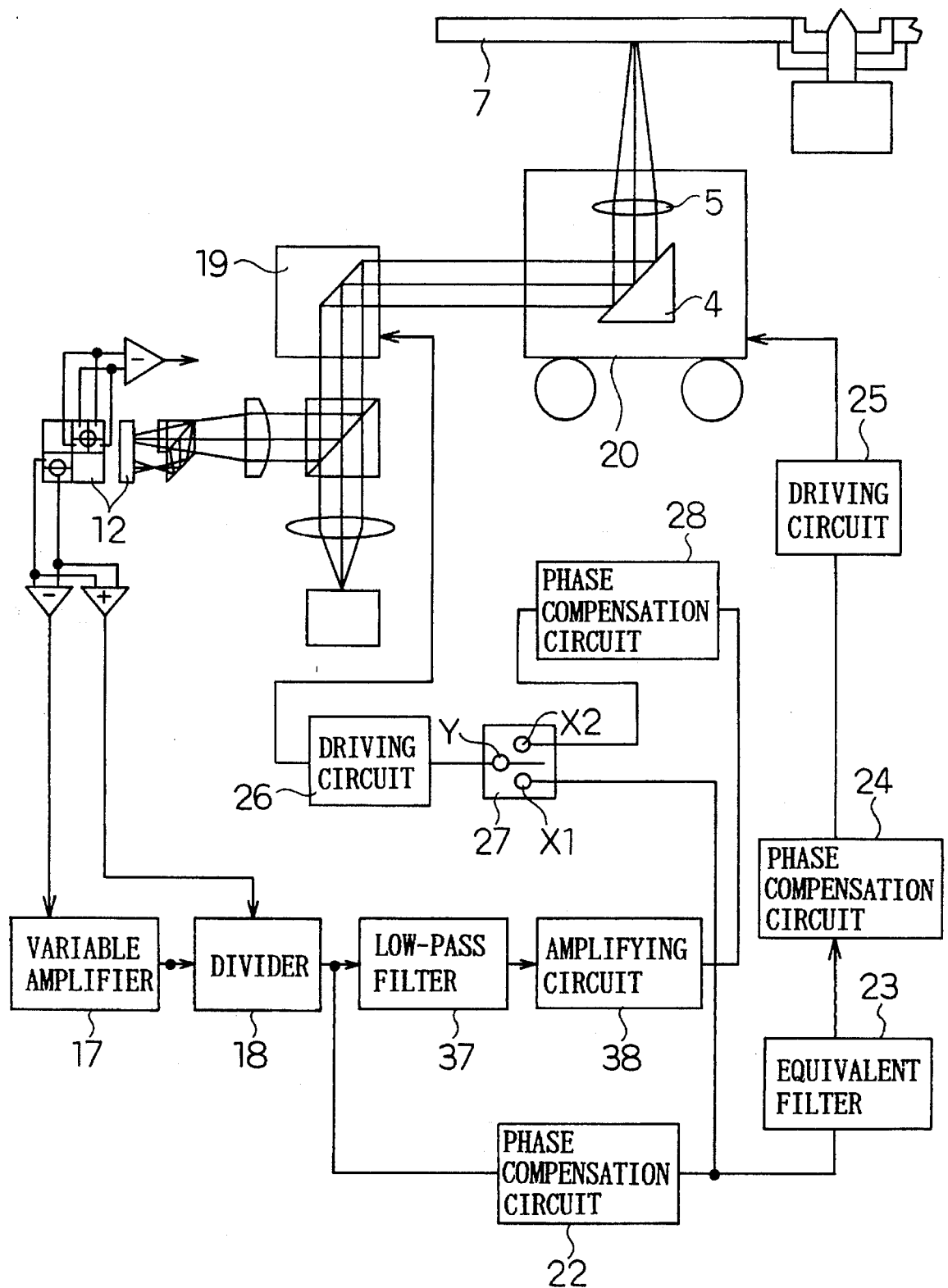
FIG. 26 is a block diagram showing the constituents of a tracking controller for explaining the fourth embodiment of the present invention.
Figure 27:
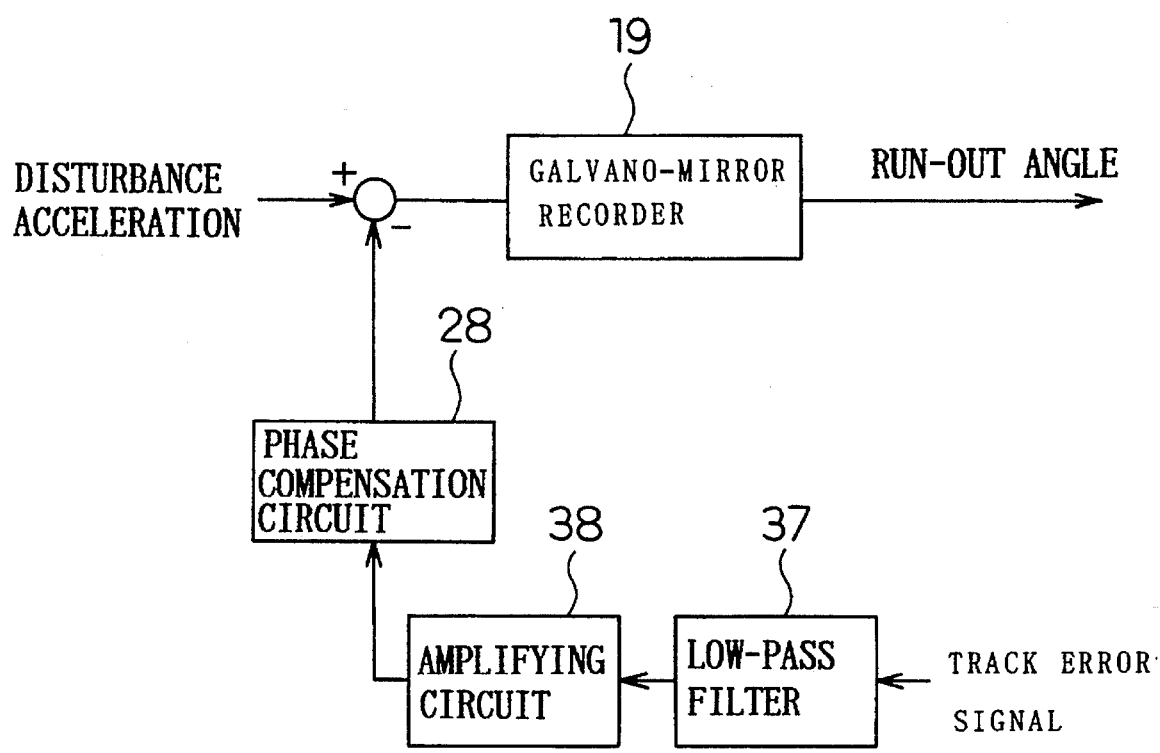
FIG. 27 is a block diagram for explaining the lock servo of the fourth embodiment of the present invention.

FIG. 26 is a block diagram showing the constituents of this embodiment. A component same as that in the first embodiment is provided with the same symbol and its description is omitted. FIG. 27 is a block diagram of the lock servo in the fourth embodiment.

As shown in FIG. 26, a track error signal which is an output of a divider 18 is inputted to a low-pass filter 37 to extract the DC offset component of the track error signal. The extracted DC offset component of the track error signal is gain-adjusted by an amplifying circuit 38. The gain of the amplifying circuit 38 is set to a value suitable for correcting an optical axis deviation due to rotation of the galvano-mirror recorder 19. The gain-adjusted DC offset component of the track error signal, that is, the output of the amplifying circuit 3g is phase-compensated by a phase compensation circuit 28 for compensating the phase at the gain intersection point of the lock servo and returned to the negative input terminal of a driving circuit 26 for driving the galvano-mirror recorder 19 through a signal selection circuit 27. When the lock servo operation is executed, the signal selection circuit 27 selects an output signal of the phase compensation circuit 28 of the lock servo.

The fourth embodiment of the present invention makes it possible to constitute the lock servo without using the reflection-type photosensor 21 by securing the galvano-mirror recorder around a place where the optical axis of an optical system is aligned with the luminous flux center of a light spot, though the lock servo characteristic at a high frequency is slightly inferior to those of the second and third embodiments.

(Fifth Embodiment)

The fifth embodiment of the tracking controller of the present invention is described below by referring to FIGS. 28 and 29. The tracking control in this embodiment is performed similarly to that in the first embodiment. Therefore, the description of it is omitted.

Figure 28:
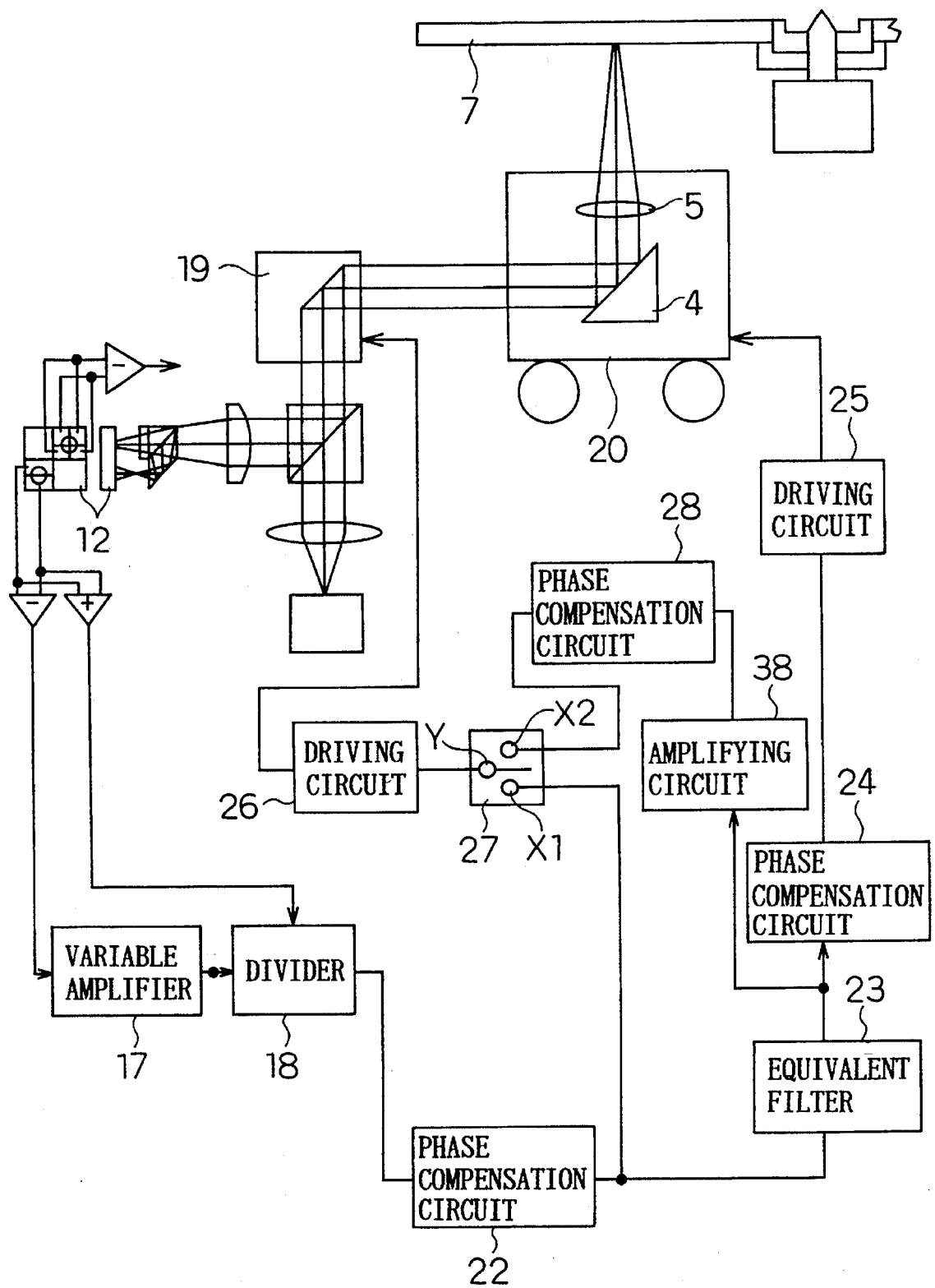
FIG. 28 is a block diagram showing the constituents of a tracking controller for explaining the fifth embodiment of the present invention.
Figure 29:
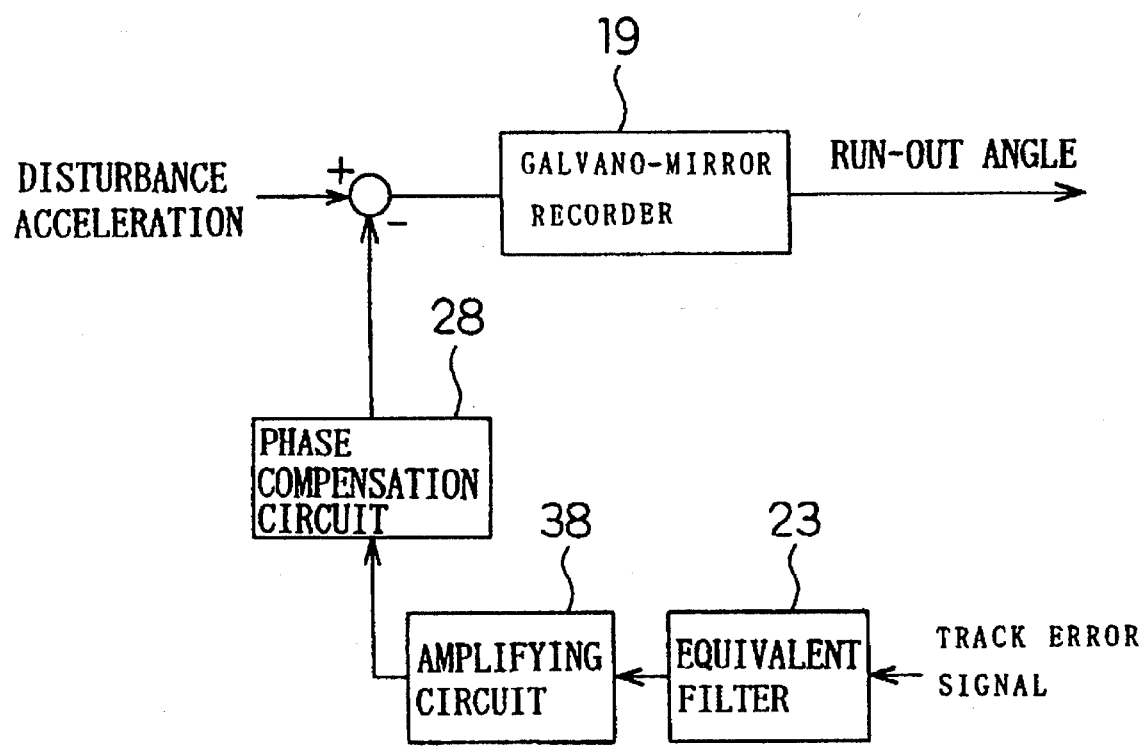
FIG. 29 is a block diagram for explaining the lock servo of the fifth embodiment of the present invention.

First, a lock servo of a galvano-mirror recorder 19 of this embodiment is described by referring to FIGS. 28 and 29.

FIG. 28 is a block diagram showing the constituents of this embodiment. A component same as that in the first embodiment is provided with the same symbol and its description is omitted. FIG. 29 is a block diagram of the lock servo in the fifth embodiment.

A difference between the fourth and fifth embodiments lies in the lock servo of the galvano-mirror recorder 19. As shown in FIG. 28, the fifth embodiment is constituted so as to extract the DC offset component of a track error signal by using an equivalent filter 23 of a control loop of a linear motor 20 though the fourth embodiment uses a low-pass filter to extract the DC offset component of the track error signal. Others are the same as the fourth embodiment and the extracted DC offset component of the track error signal is gain-adjusted by an amplifying circuit 38. The gain of the amplifying circuit 38 is set to a value suitable for correcting an optical axis deviation due to rotation of the galvano-mirror recorder 19. The gain-adjusted DC offset component of the track error signal is phase-compensated by a phase compensation circuit 28 for compensating the phase at the gain intersection point of the lock servo and returned to the negative input terminal of a driving circuit 26 for driving the galvano-mirror recorder 19. When the lock servo operation is executed, a signal selection circuit 27 selects an output signal of the phase compensation circuit 28 of the lock servo.

The fifth embodiment is constituted so as to extract the low-frequency component of the track error signal by using the equivalent filter 23 of the control loop of the linear motor instead of the low-pass filter of the fourth embodiment. Therefore, a reflection-type photosensor 21 and a low-pass filter can be omitted.

What is claimed is:

1. A tracking controller comprising:

converging means for converging a light beam on a recording medium, the converging means having an optical axis and the recording medium having a plurality of tracks formed thereon;

light beam direction changing means for receiving a driving signal and deviating the light beam in response to the driving signal such that a convergent point of the light beam moves in a direction crossing the tracks formed on the recording medium;

track error detecting means for generating a track error signal corresponding to a position of the convergent point of the light beam relative to one of said tracks;

deviation angle detecting means for detecting a deviation angle of the light beam relative to the optical axis of the converging means;

correction value calculating means for calculating a correction value for canceling an offset in the track error signal generated due to a deviation of the light beam by the light beam direction changing means, the correction value calculating means calculating the correction value based upon the deviation angle detected by the deviation angle detecting means;

correcting means for correcting the track error signal in accordance with the correction value calculated by the correction value calculating means; and driving controlling means for producing the driving signal in response to the track error signal corrected by the track error signal correcting means.

2. The tracking controller according to claim 1, wherein the correction value calculating means includes symmetry detecting means for detecting a deviation of symmetry of the corrected track error signal, and the correcting means includes deviation angle detection signal correcting means for correcting a deviation angle signal detected by the deviation angle detecting means so as to eliminate the deviation of the symmetry correspondingly to the symmetry deviation detected by the symmetry detecting means.

3. The tracking controller according to claim 1, further comprising symmetry detecting means for detecting a deviation of symmetry of the corrected track error signal, and correction value correcting means for correcting said correction value so as to eliminate the deviation of the symmetry correspondingly to the symmetry deviation detected by the symmetry detecting means.

4. The tracking controller according to claim 1, further comprising symmetry detecting means for detecting a deviation of symmetry of the corrected track error signal, and track error signal correcting means for correcting said track error signal so as to eliminate the symmetry deviation correspondingly to the symmetry deviation detected by the symmetry detecting means.

\* \* \* \* \*